(12) United States Patent
Uno et al.

(10) Patent No.: US 12,684,021 B2
(45) Date of Patent: Jul. 14, 2026

(54) COMMUNICATION DEVICE, COMPUTER-READABLE STORAGE MEDIUM, AND METHOD FOR USING APPROPRIATE ACCESS CONTROL METHOD

(71) Applicant: BROTHER KOGYO KABUSHIKI KAISHA, Nagoya (JP)

(72) Inventors: Akihito Uno, Iwakura (JP); Satoko Ando, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 97 days.

(21) Appl. No.: 18/599,430

(22) Filed: Mar. 8, 2024

(65) Prior Publication Data

US 2024/0333773 A1 Oct. 3, 2024

(30) Foreign Application Priority Data

Mar. 31, 2023 (JP) ................................. 2023-057221

(51) Int. Cl.
*H04L 9/40* (2022.01)
(52) U.S. Cl.
CPC .................................. *H04L 63/205* (2013.01)
(58) Field of Classification Search
CPC ... H04L 9/40; H04L 63/08; H04L 63/10–108; H04L 63/20–205; H04W 12/06; H04W 12/08
See application file for complete search history.

(56) References Cited

U.S. PATENT DOCUMENTS

| | | | |
|---|---|---|---|
| 11,363,072 B1* | 6/2022 | Relan | G06F 9/451 |
| 2014/0380428 A1 | 12/2014 | Kobayashi | |
| 2015/0199496 A1* | 7/2015 | Deter | G06F 21/00 |
| | | | 726/1 |

FOREIGN PATENT DOCUMENTS

JP 2015-05222 A 1/2015

* cited by examiner

*Primary Examiner* — Kevin Bechtel
(74) *Attorney, Agent, or Firm* — Kenealy Vaidya LLP

(57) ABSTRACT

A communication device includes a method storage and a controller. The method storage stores method information indicating access control methods usable by the communication device. The indicated access control methods include a configured control method that is currently set to be used by the communication device, and a candidate control method that is a candidate for the configured control method. The controller sends a request for server method information indicating one or more server control methods supported by a first server, to the first server. The controller receives a response including the server method information from the first server via the communication interface. The controller outputs first output information to prompt a user to change the configured control method to the candidate control method, in a case where a change condition is satisfied that includes a condition that the one or more server control methods include the candidate control method.

10 Claims, 13 Drawing Sheets

| No. | C1 (MS1 ∋ Mt) | C2 (Mt=M1) | C3 (MS1 ∋ M1) | CU (for use of Mt) | CX (for recommendation of method change) | CQ (for query) |
|---|---|---|---|---|---|---|
| 1 | Y | Y | – (Y) | Y | N | N |
| 2 | Y | – (N) | N | Y | N | N |
| 3 | Y | N | Y | N | Y | N |
| 4 | N | – (N) | Y | N | Y | N |
| 5–7 | N | – | N | N | N | Y |

| No. | C1 (MS1 ⊒ Mt) | C2 (Mt=M1) | C3 (MS1 ⊒ M1) | CU (for use of Mt) | CX (for recommendation of method change) | CQ (for query) |
|-----|------|------|------|------|------|------|
| 1 | Y | Y | – (Y) | Y | N | N |
| 2 | Y | – (N) | N | Y | N | N |
| 3 | Y | N | Y | N | Y | N |
| 4 | N | – (N) | Y | N | Y | N |
| 5–7 | N | – | N | N | N | Y |

FIG. 3

| LOCATION INFORMATION AD | SERVICE NAME SN | RECOMMENDED ACCESS CONTROL METHODS MA |
|---|---|---|
| AD1 | SN1 | MA1 (XOAUTH2) |
| AD2 | SN2 | MA2 (CRAM-MD5, XOAUTH2) |
| ⋮ | ⋮ | ⋮ |

300A→ (row AD1), 300B→ (row AD2), D4A

FIG. 9A

| MODEL INFORMATION MI (MD - FWv) | USABLE ACCESS CONTROL METHODS MB |
|---|---|
| MIa1 (MDa – FWva1) | MBa1 (PLAIN, CRAM-MD5) |
| MIb1 (MDb – FWvb1) | MBb1 (PLAIN, XOAUTH2) |
| ⋮ | ⋮ |

| MODEL INFORMATION MI (MD - FWv) | USABLE ACCESS CONTROL METHODS MB |
|---|---|
| MIa1 (MDa – FWva1) | MBa1 (PLAIN, CRAM-MD5) |
| MIa2 (MDa – FWva2) | MBa2 (PLAIN, XOAUTH2, CRAM-MD5) |
| MIb1 (MDb – FWvb1) | MBb1 (PLAIN, XOAUTH2U) |
| ⋮ | ⋮ |

COMMUNICATION DEVICE, COMPUTER-READABLE STORAGE MEDIUM, AND METHOD FOR USING APPROPRIATE ACCESS CONTROL METHOD

REFERENCE TO RELATED APPLICATIONS

This application claims priority from Japanese Patent Application No. 2023-057221 filed on Mar. 31, 2023. The entire content of the priority application is incorporated herein by reference.

BACKGROUND ART

A known server is configured to communicate with communication devices (e.g., printers, image scanners, smartphones, personal computers, and game consoles), thereby providing various services such as sending e-mails, receiving e-mails, remote printing, and providing web pages. The server is further configured to control access from the communication devices in various ways. For instance, a technology using OAuth (Open Authorization) has been proposed, in which a token is issued by an OAuth process under authorization by an authenticated user. The issued token is usable to access the server.

SUMMARY

Various access control methods may be used. For instance, the server may perform access control through authentication using a user ID and a password. In addition, the server may perform access control using a token (e.g., an OAuth token) that indicates authorization. However, there may be cases in which communication devices use access control methods that are not appropriate for the server.

Aspects of the present disclosure are advantageous for providing one or more improved techniques to reduce the possibility that a communication device uses access control methods that are not appropriate for server.

According to aspects of the present disclosure, a communication device is provided, which includes a communication interface, a method storage, and a controller. The method storage is configured to store method information indicating access control methods usable by the communication device. The indicated access control methods include a configured control method and a candidate control method. The configured control method is currently set to be used by the communication device. The candidate control method is a candidate for the configured control method. The controller is configured to send a request for server method information indicating one or more server control methods supported by a first server, to the first server via the communication interface. The controller is further configured to receive a response including the server method information from the first server via the communication interface. The controller is further configured to output first output information to prompt a user to change the configured control method to the candidate control method, in a case where a change condition is satisfied. The change condition includes a condition that the one or more server control methods indicated by the received server method information include the candidate control method.

According to aspects of the present disclosure, further provided is a non-transitory computer-readable storage medium storing computer-readable instructions that are executable by a processor of a communication device. The instructions are configured to, when executed by the processor, cause the communication device to send a request for server method information indicating one or more server control methods supported by a first server, to the first server via a communication interface of the communication device. The communication device includes the processor, the communication interface, and a method storage. The method storage is configured to store method information indicating access control methods usable by the communication device. The indicated access control methods include a configured control method and a candidate control method. The configured control method is currently set to be used by the communication device. The candidate control method is a candidate for the configured control method. The instructions are further configured to, when executed by the processor, cause the communication device to receive a response including the server method information from the first server via the communication interface. The instructions are further configured to, when executed by the processor, cause the communication device to output first output information to prompt a user to change the configured control method to the candidate control method, in a case where a change condition is satisfied. The change condition includes a condition that the one or more server control methods indicated by the received server method information include the candidate control method.

According to aspects of the present disclosure, further provided is a method implementable on a controller of a communication device. The method includes sending a request for server method information indicating one or more server control methods supported by a first server, to the first server via a communication interface of the communication device. The communication device includes the controller, the communication interface, and a method storage. The method storage is configured to store method information indicating access control methods usable by the communication device. The indicated access control methods include a configured control method and a candidate control method. The configured control method is currently set to be used by the communication device. The candidate control method is a candidate for the configured control method. The method further includes receiving a response including the server method information from the first server via the communication interface. The method further includes outputting first output information to prompt a user to change the configured control method to the candidate control method, in a case where a change condition is satisfied. The change condition includes a condition that the one or more server control methods indicated by the received server method information include the candidate control method.

BRIEF DESCRIPTION OF DRAWINGS

FIG. 3 is a table showing each correspondence relationship between a combination of determination results for status conditions and a combination of determination results for process conditions.

FIG. 9A shows an example of a server table.

FIGS. 9B and 9C show examples of a terminal table.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A. First Illustrative Embodiment

A1. Configuration of System

Figure 1:
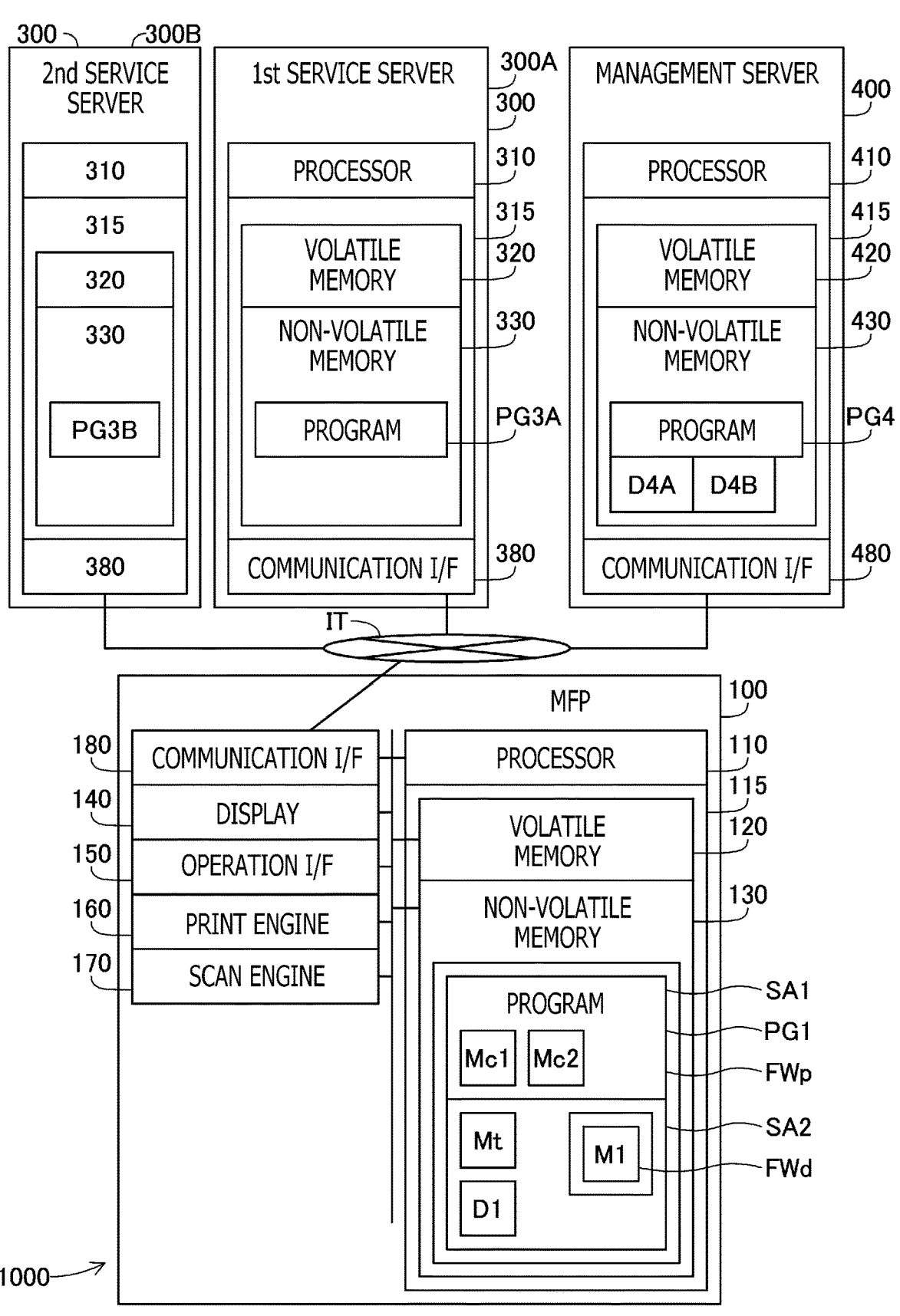
FIG. 1 is a block diagram showing a configuration of a system.

FIG. 1 is a block diagram showing a configuration of a system in a first illustrative embodiment according to aspects of the present disclosure. A system 1000 includes an MFP ("MFP" is an abbreviation for "multi-function peripheral") 100, service servers 300A and 300B, and a management server 400. These devices included in the system 1000 are connected with a network IT. Examples of the network IT may include, but are not limited to, a so-called Internet and a so-called local area network.

The MFP 100 includes a processor 110, a storage 115, a display 140, an operation I/F ("I/F" is an abbreviation of "interface") 150, a print engine 160, a scan engine 170, and a communication I/F 180. These elements included in the MFP 100 are interconnected via a bus.

The display 140 is configured to display images. Examples of the display 140 may include, but are not limited to, a liquid crystal display and an organic electroluminescent display. The operation I/F 150 is configured to receive user operations. The operation I/F 150 include, for instance, buttons, levers, and a touch screen superimposed on the display 140. The communication I/F 180 is configured to communicate with other devices. The communication I/F 180 includes at least one type of interface selected from a plurality of types of interfaces consisting of a wired LAN, and an IEEE 802.11 wireless LAN. The communication I/F 180 is connected with the network IT.

The print engine 160 is a device for printing images. In the first illustrative embodiment, the print engine 160 is a so-called inkjet printer. The print engine 160 is configured to print images using one or more types of printing agent (e.g., ink of the four colors cyan, magenta, yellow, and black). The print engine 160 may be configured to print images in a printing method (e.g., a laser printing method) other than the inkjet printing method.

The scan engine 170 is a device for optically reading an object such as a document. In the first illustrative embodiment, the scan engine 170 includes an optical sensor (not shown). The scan engine 170 is configured to optically read the object, thereby generating scanned data representing the read object.

The processor 110 is a device configured to perform data processing. For instance, the processor 110 includes a CPU ("CPU" is an abbreviation for "central processing unit") and/or a SoC ("SoC" is an abbreviation for "system on a chip"). The storage 115 includes a volatile memory 120 and a non-volatile memory 130. For instance, the volatile memory 120 includes a DRAM. For instance, the non-volatile memory 130 includes a flash memory.

The non-volatile memory 130 has a first storage area SA1 and a second storage area SA2. The first storage area SA1 stores therein data of first firmware FWp including a program PG1. Processes to be performed by the processor 110 according to the program PG1 include a process of causing the print engine 160 to print an image, a process of causing the scan engine 170 to read a document, a process of communicating with the service servers 300A and 300B, and a process of communicating with the management server 400. The second storage area SA2 stores therein data of second firmware FWd, data of a configured control method Mt, and data of access information D1. The second firmware FWd includes a candidate control method M1. The data of the firmware FWp and FWd are stored in the non-volatile memory 130 at the time of manufacture of the MFP 100. The program PG1 and the information Mt, M1, and D1 will be described in detail later.

Hardware configurations of the servers 300A, 300B, and 400 will be described. In the first illustrative embodiment, the servers 300A, 300B, and 400 have similar hardware configurations. Although the following features are not shown in any drawings, the hardware configurations (including the elements 310, 315 (320, 330), and 380) of the service servers 300A and 300B are substantially the same as each other. Hereinafter, the hardware configurations of the servers will be described below with reference to the first service server 300A and the management server 400.

The first service server 300A includes a processor 310, a storage 315, and a communication I/F 380. Likewise, the management server 400 includes a processor 410, a storage 415, and a communication I/F 480. These elements included in each server are interconnected via a bus (not shown). Each of the communication I/Fs 380 and 480 is configured to communicate with other devices. For instance, each of the communication I/Fs 380 and 480 includes at least one type of interface selected from a plurality of types of interfaces consisting of a wired LAN, and an IEEE 802.11 wireless LAN. Each of the communication I/Fs 380 and 480 is connected with the network IT. Each of the processors 310 and 410 is a device configured to perform data processing. For instance, each of the processors 310 and 410 includes a CPU and/or a SoC. The storage 315 includes a volatile storage device 320, and a non-volatile storage device 330. Likewise, the storage 415 includes a volatile storage device 420, and a non-volatile storage device 430. For instance, each of the volatile storage devices 320 and 420 includes a DRAM. For instance, each of the non-volatile storage devices 330 and 430 includes a flash memory.

The service servers 300A and 300B will be described below. Each of the service servers 300A and 300B is configured to perform processing for providing services using the MFP 100. The services using the MFP 100 may include, but are not limited to, a delivery service to obtain the remaining amounts of consumables (e.g., ink and sheets) via the network IT and deliver the consumables to the user according to the remaining amounts, and a service to cause the MFP 100 to print images via the network IT. In the first illustrative embodiment, the service servers 300A and 300B are so-called mail servers. The MFP 100 is configured to send and receive e-mails by using the service servers 300A and 300B. E-mails may be used in various processes. For instance, the MFP 100 may send an e-mail containing scanned data to a user's e-mail address via the service server 300A or 300B. In addition, the MFP may receive an e-mail containing image data for printing via the service server 300A or 300B. Hereinafter, a service provided by the first service server 300A may be referred to as a "first service." A service provided by the second service server 300B may be referred to as a "second service."

The non-volatile storage device 330 of the first service server 300A stores data of a program PG3A. The processor 310 of the first service server 300A is configured to execute the program PG3A, thereby performing various processes to provide a mail service. Likewise, the non-volatile storage device 330 of the second service server 300B stores data of a program PG3B. The processor 310 of the second service server 300B is configured to execute the program PG3B, thereby performing various processes to provide the mail service.

The service servers 300A and 300B are configured to control access from communication devices (e.g., the MFP 100) in various methods. Examples employable as access control methods may include, but are not limited to, PLAIN, CRAM-MD5, and XOAUTH2. PLAIN is an authentication method using a user name and a password. CRAM-MD5 is an authentication method using a so-called challenge and response. XOAUTH2 is a method to permit access by an access token.

The program PG1 of the MFP 100 includes a plurality of processing modules Mc1 and Mc2 for communication with the servers. These processing modules Mc1 and Mc2 correspond to different access control methods, respectively. For instance, the first processing module Mc1 may correspond to "PLAIN." The second processing module Mc2 may correspond to "XOAUTH2." The program PG1 may further include processing modules corresponding to other access control methods. Each processing module has a function of sending a request for access permission based on the corresponding control method to a server. Available processing modules (what processing modules are available) may be updated by updating the first firmware FWp. For instance, a new processing module corresponding to a new access control method may be added by updating the first firmware FWp.

The MFP 100 is enabled to use access control methods that are associated with the installed processing modules. The candidate control method M1 indicates a recommended access control method. The candidate control method M1 is predetermined at the time of manufacture (i.e., before shipment) of the MFP 100. The candidate control method M1 is set to a control method with a higher security level than one or more other control methods among the usable access control methods. For instance, a control method with a higher security level than "PLAIN" is employed as the candidate control method M1. The appropriate candidate control method M1 may change in response to the first firmware FWp being updated. In this case, it is preferred that the second firmware FWd be updated together with the first firmware FWp. The candidate control method M1 may be updated in response to the second firmware FWd being updated.

In the first illustrative embodiment, a predetermined security level is employed as the security level of each access control method. Such a security level is determined in such a manner that the more difficult it is to gain unauthorized access, the higher the security level is. As a descending order (from a higher level to a lower one) of the security levels of "PLAIN," "CRAM-MD5," and "XOAUTH2," an order of "XOAUTH2," "CRAM-MD5," and "PLAIN" may be employed. The security level of each access control method may be evaluated at two levels, i.e., the level of an authentication method (which may be referred to as "PLAIN authentication" or "basic authentication") using a user name and a password, and the level of any other access control method. Usually, the security levels of the other access control methods are higher than the security level of the basic authentication. Various access control methods other than "PLAIN" may be employed as the candidate control method M1.

The configured control method Mt is an access control method that is currently set to be used by the MFP 100. The access information D1 is information (e.g., a user name and a password, and an access token) used for access using the configured control method Mt. Each of the configured control method Mt and the candidate control method M1 may represent various types of information (e.g., a name of a corresponding access control method, and an identification number assigned to the corresponding access control method) that indicate the corresponding access control method.

For communication with the service servers 300A and 300B, the MFP 100 configures access settings for the access control methods supported by the service servers 300A and 300B (e.g., the MFP 100 configures the control method Mt and the access information D1). The service servers 300A and 300B may update the supported access control methods to improve the security level. For instance, the service servers 300A and 300B may start support for XOAUTH2 and terminate support for PLAIN. When the supported access control methods are updated, the communication devices (e.g., the MFP 100) may be required to configure access settings for new access control methods.

The management server 400 is configured to assist the communication devices (e.g., the MFP 100) in configuring the access settings. The non-volatile storage device 430 of the management server 400 stores data of a program PG4, data of a server table D4A, and data of a terminal table D4B. The program PG4 show procedures for various processes to assist the communication devices. The program PG4 and the tables D4A and D4B will be described in detail later.

A2. Communication Processing

A2-1. First Process

Figure 2:
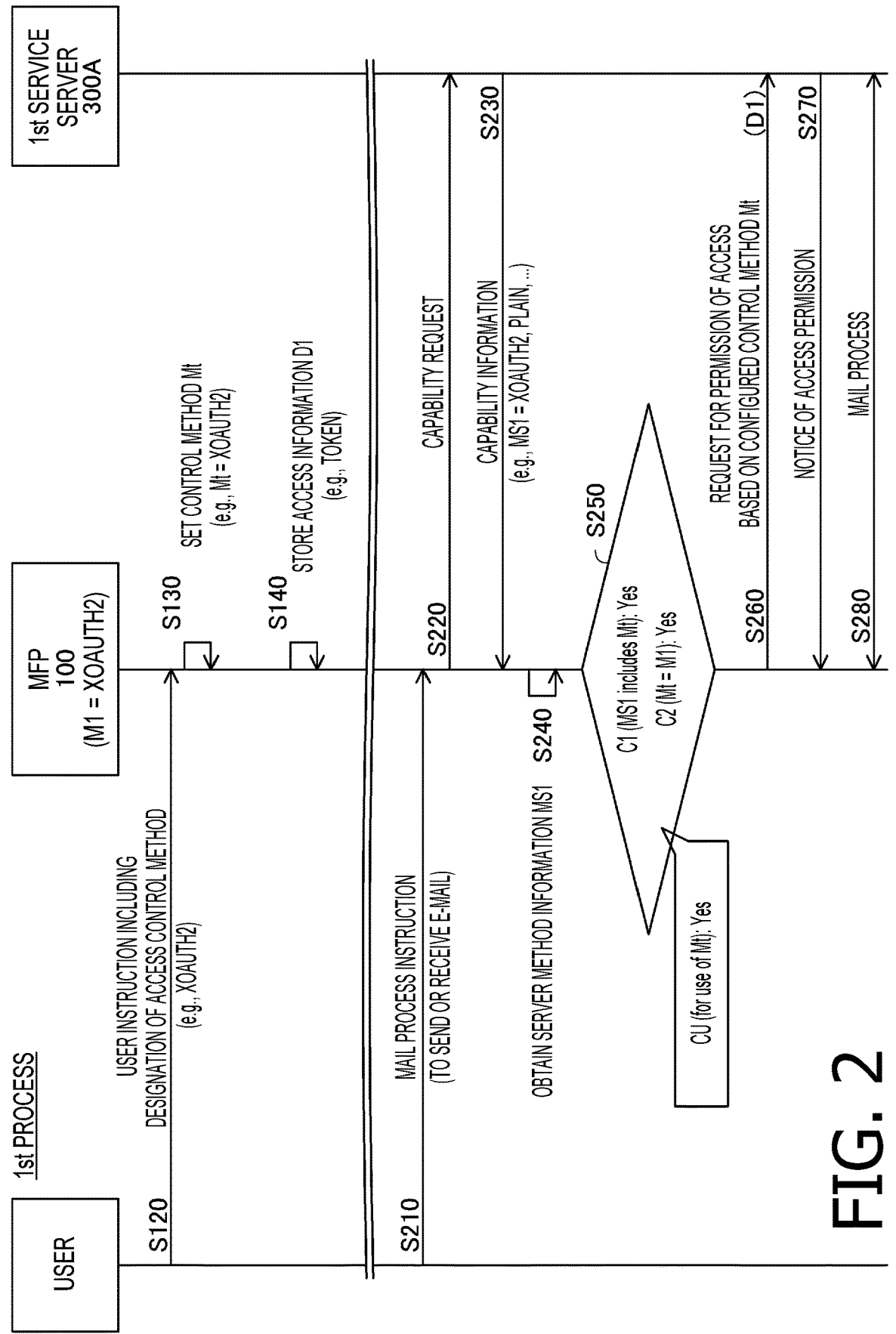
FIG. 2 is a sequence chart showing a procedure of a first process that is an example of communication processing.

FIG. 2 is a sequence chart showing a first process, which is an example of communication processing. In the first process, the user configures access settings for the MFP 100 to communicate with the first service server 300A (hereinafter, which may be referred to simply as the "first server 300A"). The MFP 100 communicates with the first server 300A according to the access settings. Here, it is assumed that the candidate control method M1 is "XOAUTH2."

In S120, a user inputs a user instruction into the MFP 100. The user instruction to be input includes designation of a service server and an access control method. It is assumed that the first server 300A is specified as the service server.

The access control method is selected from among the access control methods usable by the MFP 100. Here, it is assumed that the access control method specified by the user instruction is the same as the candidate control method M1 (in this case, "XOAUTH2").

Any practicable method may be used as a method for inputting the user instruction into the MFP 100. For instance, the user may input the user instruction by operating the operation I/F 150 of the MFP 100 (see FIG. 1). In addition, by operating a terminal device (e.g., a smartphone) that is communicable with the MFP 100, the user may input the user instruction into the MFP 100 via the terminal device. Substantially the same may apply to after-mentioned other steps.

In S130, the processor 110 of the MFP 100 sets the control method Mt according to the user instruction input in S120 (Mt=XOAUTH2). In S140, the processor 110 obtains the access information D1 for the configured control method Mt, and stores data of the obtained access information D1 in the non-volatile memory 130 in association with the service server (in this case, the first server 300A). The access information D1 may include at least one of various types of information suitable for the configured control method Mt. Examples of practicable methods for obtaining the access information D1 may include various methods suitable for the configured control method Mt. For instance, the access information D1 may include an access token and a refresh token. The processor 110 may obtain these tokens from an authorization server (not shown) by communicating with the authorization server. The authorization server may obtain user's permission from a user's terminal device (not shown) and issue these tokens under the obtained permission.

In S210, the user inputs a mail process instruction into the MFP 100. The mail process instruction may be an instruction to send an e-mail or an instruction to receive an e-mail. A case where an instruction to send an e-mail is input will be described below.

In S220, the processor 110 of the MFP 100 sends a capability request to the first server 300A. The capability request is an example of a request for information indicating one or more access control methods supported by the first server 300A. The capability request may be a part of the communication processing for a mail process between a client and a server.

In S230, the processor 310 of the first server 300A sends data of capability information to the MFP 100. The capability information includes information (hereinafter, which may be referred to as "server method information MS1") indicating the one or more access control methods supported by the first server 300A. In the following description, it is assumed that the server method information MS1 includes "XOAUTH2" and "PLAIN."

In S240, the processor 110 of the MFP 100 obtains server method information MS1 by analyzing the capability information.

In S250, the processor 110 makes a condition determination for process switching (hereinafter, which may be referred to as the "process condition determination"). FIG. 3 is a table showing examples of the condition determination. In the first illustrative embodiment, one of the following conditions, i.e., a use process condition CU, a change process condition CX, and a query process condition CQ is satisfied by the condition determination. The processor 110 performs a process corresponding to the satisfied process condition. As will be described below, the use process condition CU is associated with a process using the current configured control method Mt. The change process condition CX is associated with a process of prompting the user to change the configured control method Mt to the candidate control method M1. The query process condition CQ is associated with a process of making a query to the management server 400. The process conditions CU, CX, and CQ are determined using the results of the following status conditions C1, C2, and C3.

A first status condition C1 is a condition that the server method information MS1 includes the configured control method Mt.

A second status condition C2 is a condition that the configured control method Mt is the same as the candidate control method M1.

A third status condition C3 is a condition that the server method information MS1 includes the candidate control method M1.

The table shown in FIG. 3 shows each correspondence relationship between a combination of determination results for the status conditions C1, C2, and C3 and a combination of determination results for the process conditions CU, CX, and CQ. A number "No." indicates a number of a process (to be described below) associated with each correspondence relationship. In the table, "Y" ("Y" is an abbreviation for "Yes") indicates that the condition is satisfied, and "N" ("N" is an abbreviation for "No") indicates that the condition is not satisfied. As shown in the table, one of the process conditions CU, CX, and CQ is satisfied in each combination of the determination results for the process conditions CU, CX, and CQ. A process associated with the process condition that is satisfied is performed. A process associated with the process condition that is not satisfied is not performed.

As shown in No. 1 and No. 2 of FIG. 3, the use process condition CU is satisfied in a case of "C1: Yes, and C2: Yes (see No. 1)" and a case of "C1: Yes, and C3: No (see No. 2)." In the case of "C1: Yes, and C2: Yes (see No. 1)," as a result, the third condition C3 is satisfied. In the case of "C1: Yes, and C3: No (see No. 2)," as a result, the second condition C2 is not satisfied.

As shown in No. 3 and No. 4 of FIG. 3, the change process condition CX is satisfied in a case of "C1: Yes, C2: No, and C3: Yes (see No. 3)" and a case of "C1: No, and C3: Yes (see No. 4)." In the case of "C1: No, and C3: Yes (see No. 4)," as a result, the second condition C2 is not satisfied.

As shown in No. 5 to No. 7 of FIG. 3, the query process condition CQ is satisfied in a case of "C1: No, and C3: No," regardless of the determination result of the second status condition C2.

The first process shown in FIG. 2 corresponds to No. 1 in FIG. 3. In the first process, the two conditions C1 and C2 are satisfied (i.e., the use process condition CU is satisfied). In this case, in S260, the processor 110 sends a request for permission of access based on the configured control method Mt to the first server 300A. This request contains control information determined based on the access information D1. The control information is information used for access control by the first server 300A. The control information may include at least one of various types of information suitable for the configured control method Mt. For instance, the control information may include the access token included in the access information D1. If the access token has expired, the processor 110 may use the refresh token included in the access information D1 to obtain a new access token and a new refresh token from the authorization server. The processor 110 may store the obtained new access token in the non-volatile memory 130 as new data in the access information D1.

In S270, the processor 310 of the first server 300A determines whether to permit access by using the control information included in the request for access permission. Here, it is assumed that the access is permitted. The processor 310 sends a notice of access permission to the MFP 100.

In S280, the processor 110 of the MFP 100 and the processor 310 of the first server 300A perform communication for the mail process with each other. The processor 110 of the MFP 100 sends to the first server 300A a mail transmission request that is a request to send an e-mail, or a mail reception request that is a request to receive an e-mail, in response to the mail process instruction received in S210. The mail transmission request contains e-mail data to be sent. In response to receiving the mail transmission request, the processor 310 of the first server 300A sends the e-mail data contained in the received mail transmission request to a destination of the e-mail data. In response to receiving the mail reception request, the processor 310 of the first server 300A sends received e-mail data to the MFP 100.

A2-2. Second Process

Figure 4:
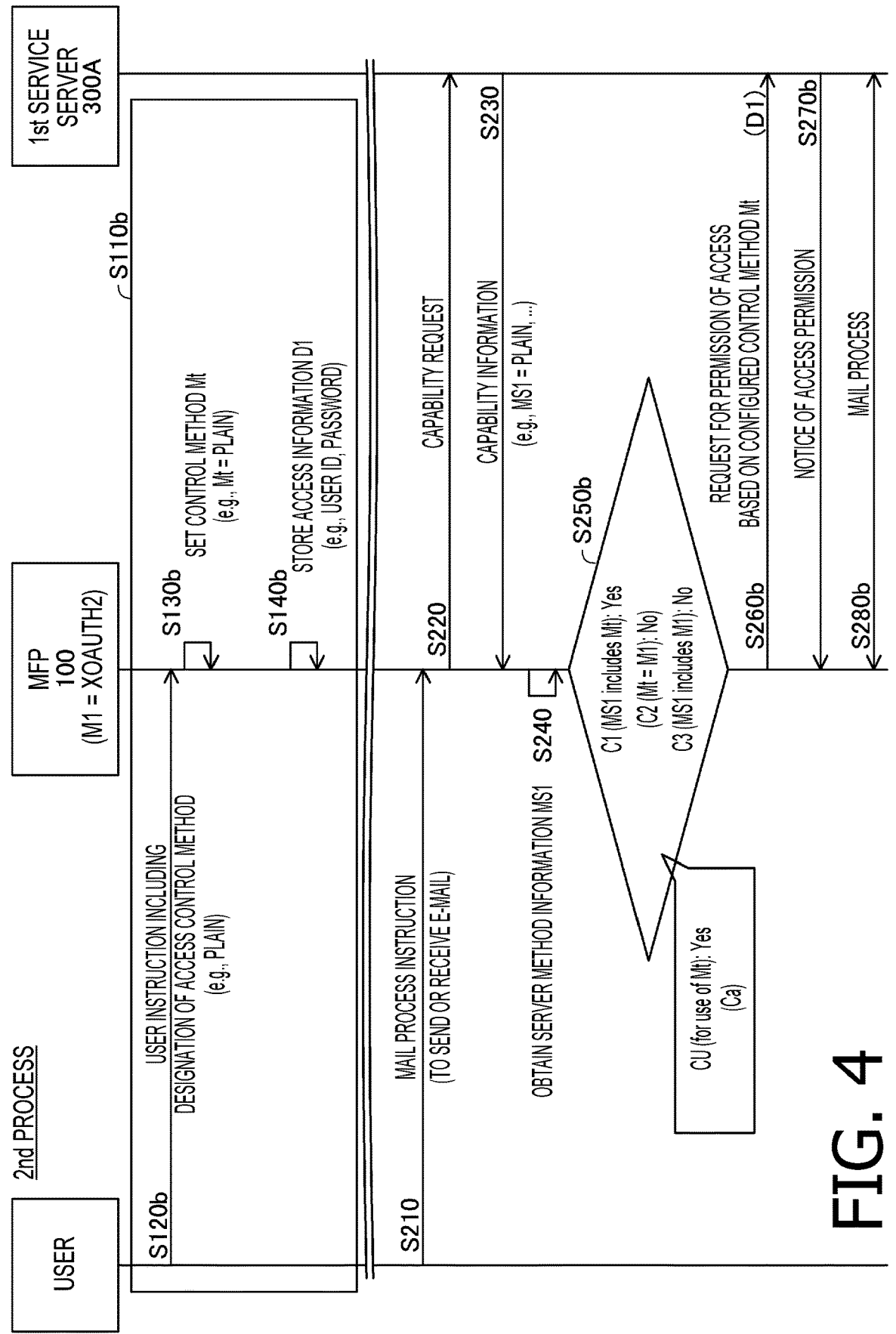
FIG. 4 is a sequence chart showing a procedure of a second process that is an example of the communication processing.

FIG. 4 is a sequence chart showing a second process, which is an example of the communication processing. The second process corresponds to No. 2 in FIG. 3. Here, it is assumed that the candidate control method M1 is "XOAUTH2."

In FIG. 4, S120$b$, S130$b$, and S140$b$ correspond to S120, S130, and S140 in FIG. 2, respectively. Here, it is assumed that in S120$b$, a user instruction specifies "PLAIN." In S120$b$, the user inputs the user instruction into the MFP 100. In S130$b$, the processor 110 of the MFP 100 sets the control method Mt to "PLAIN." In S140$b$, the processor 110 obtains the access information D1 for the configured control method Mt, and stores data of the obtained access information D1 in the non-volatile memory 130 in association with the service server (in this case, the first server 300A). For instance, the access information D1 includes a user name and a password. The user name and the password may be specified by the user instruction. Hereinafter, the entirety of S120$b$, S130$b$, and S140$b$ may be referred to as "S110$b$."

In FIG. 4, methods used in S210, S220, S230, and S240 are substantially the same as the methods used in S210, S220, S230, and S240 of FIG. 2, respectively. In the second process, it is assumed that the server method information MS1 received in S230 includes "PLAIN" without including "XOAUTH2.

In S250$b$, the processor 110 makes a process condition determination. Specifically, in this step of the second process, the processor 110 makes a determination of C1: Yes and C3: No. Namely, the use process condition CU is satisfied.

When the use process condition CU is satisfied, the processor 110 executes S260$b$, S270$b$, and S280$b$. In FIG. 4, S260$b$, S270$b$, and S280$b$ correspond to S260, S270, and S280 in FIG. 2, respectively. Here, "PLAIN" is used as the access control method to be sent in S260$b$. In S260$b$, the processor 110 sends a request for permission of access based on the configured control method Mt to the first server 300A. This request contains control information (e.g., a user name and a password based on the access information D1) suitable for the configured control method Mt. In S270$b$, the processor 310 of the first server 300A sends a notice of access permission to the MFP 100 (in this case, the access is assumed to be permitted based on the control information). In S280$b$, the processor 110 of the MFP 100 and the processor 310 of the first server 300A perform communication for the mail process with each other.

A2-3. Third Process

Figure 5:
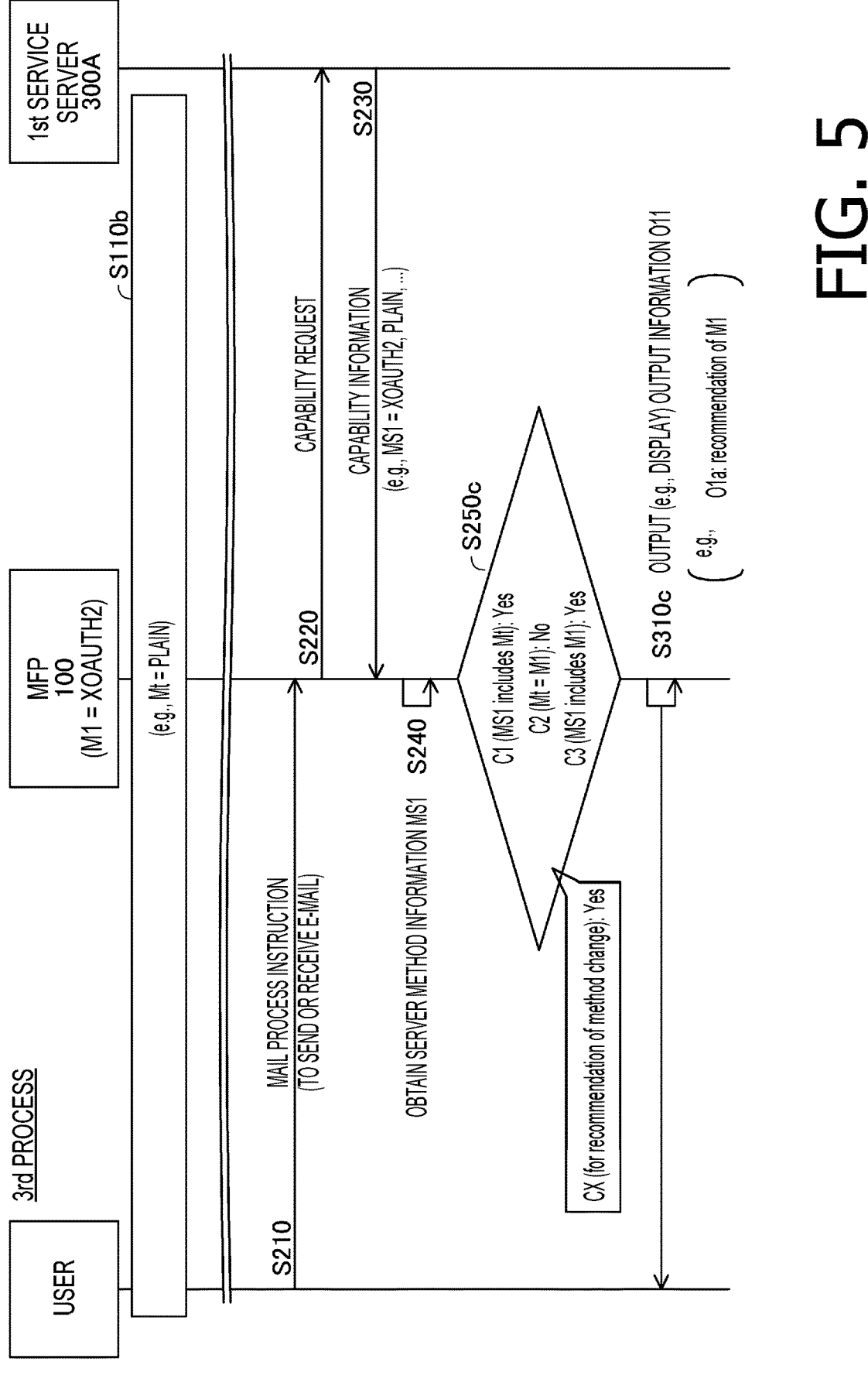
FIG. 5 is a sequence chart showing a procedure of a third process that is an example of the communication processing.

FIG. 5 is a sequence chart showing a third process, which is an example of the communication processing. The third process corresponds to No. 3 in FIG. 3. The conditions (i.e., C1: Yes, C2: No, and C3: Yes) for No. 3 may be satisfied, for instance, when the first server 300A newly starts supporting the candidate control method M1. Here, it is assumed that in the third process, the candidate control method M1 set in the MFP 100 is "XOAUTH2."

In FIG. 5, S110$b$ is substantially the same as S110$b$ in FIG. 4. Specifically, in S110$b$, the access settings for "PLAIN" are configured. It is assumed that the first server 300A supports "PLAIN."

In FIG. 5, methods used in S210, S220, S230, and S240 are substantially the same as the methods used in S210, S220, S230, and S240 of FIG. 2, respectively. In the third process, it is assumed that the server method information MS1 received in S230 includes both "XOAUTH2" and "PLAIN."

In S250$c$, the processor 110 makes a process condition determination. Specifically, in this step of the third process, the processor 110 makes a determination of C1: Yes, C2: No, and C3: Yes. Namely, the change process condition CX is satisfied.

When the change process condition CX is satisfied, in S310$c$, the processor 110 outputs first output information O11. The first output information O11 may include one or more types of information for prompting the user to change the configured control method Mt to the candidate control method M1. For instance, the first output information O11 may include recommendation information O1$a$ representing a recommendation of the candidate control method M1. The recommendation information O1$a$ may include a message to recommend the candidate control method M1. Examples of practicable methods for outputting the first output information O11 may include various methods. For instance, the processor 110 may output data of the first output information O11 to the display 140, thereby displaying the first output information O11 on the display 140. Further, the MFP 100 may include sound devices for generating a sound, such as an amplifier and a speaker. In this case, the processor 110 may output the data of the first output information O11 to the sound devices, thereby causing the sound devices to generate a sound (e.g., voice) representing the first output information O11.

The user is allowed to know, from the first output information O11, that the candidate control method M1 is recommended. Therefore, the user may promptly configure access settings to change the configured control method Mt to the candidate control method M1. This reduces the possibility of communication errors between the MFP 100 and the service server.

A2-4. Fourth Process

Figure 6:
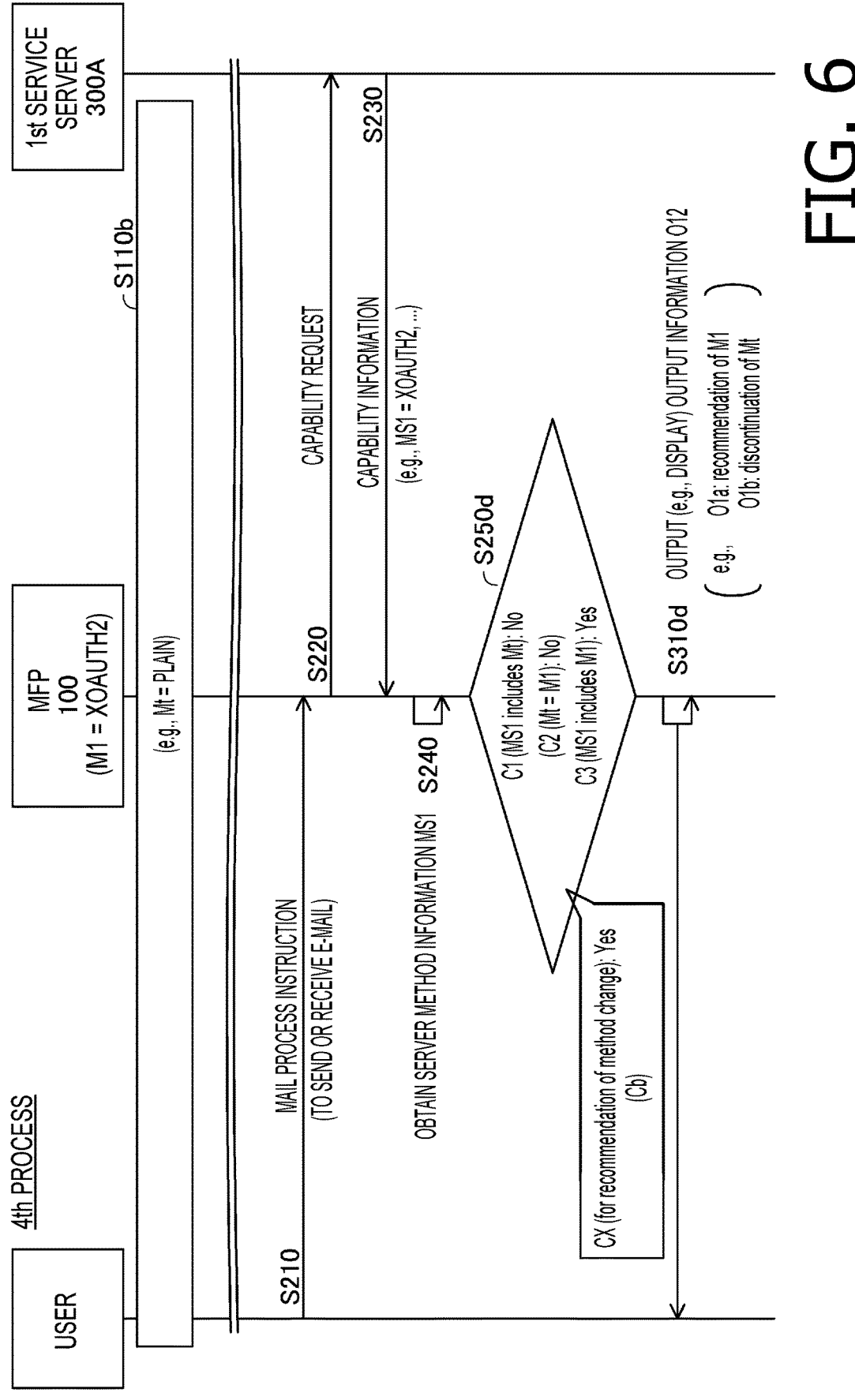
FIG. 6 is a sequence chart showing a procedure of a fourth process that is an example of the communication processing.

FIG. 6 is a sequence chart showing the fourth process, which is an example of the communication processing. The fourth process corresponds to No. 4 in FIG. 3. The conditions (i.e., C1: No, and C3: Yes) for No. 4 may be satisfied, for instance, when the first server 300A discontinues the support for the configured control method Mt. Here, it is assumed that in the fourth process, the candidate control method M1 set in the MFP 100 is "XOAUTH2."

In FIG. 6, S110$b$ is substantially the same as S110$b$ in FIG. 4. Specifically, in S110$b$, the access settings for "PLAIN" are configured. It is assumed that the first server 300A supports "PLAIN."

In FIG. 6, methods used in S210, S220, S230, and S240 are substantially the same as the methods used in S210, S220, S230, and S240 of FIG. 2, respectively. In the fourth process, it is assumed that the server method information MS1 includes "XOAUTH2" without including "PLAIN."

In S250*d*, the processor 110 makes a process condition determination. Specifically, in S250*d* of the fourth process, the processor 110 makes a determination of C1: No, C2: No, and C3: Yes. Namely, the change process condition CX is satisfied.

When the change process condition CX is satisfied, the processor 110 executes S310*d*. In S310*d*, in substantially the same manner as in S310*c* of FIG. 5, the processor 110 outputs first output information O12. In the first illustrative embodiment, the first output information O12 output in the fourth process includes discontinuance information O1*b* in addition to the recommendation information O1*a*. The discontinuance information O1*b* represents discontinuance of the configured control method Mt. The processor 110 outputs the first output information O12 that includes the recommendation information O1*a* and the discontinuance information O1*b*. An output method for outputting the first output information O12 may be the same as the output method used in S310*c* (see FIG. 5). The user is allowed to know, from the first output information O12, that the configured control method Mt is unusable and that the candidate control method M1 is recommended. Therefore, the user may promptly configure the access settings to change the configured control method Mt to the candidate control method M1. This reduces the possibility of communication errors between the MFP 100 and the service server.

A2-5. Fifth Process

Figure 7:
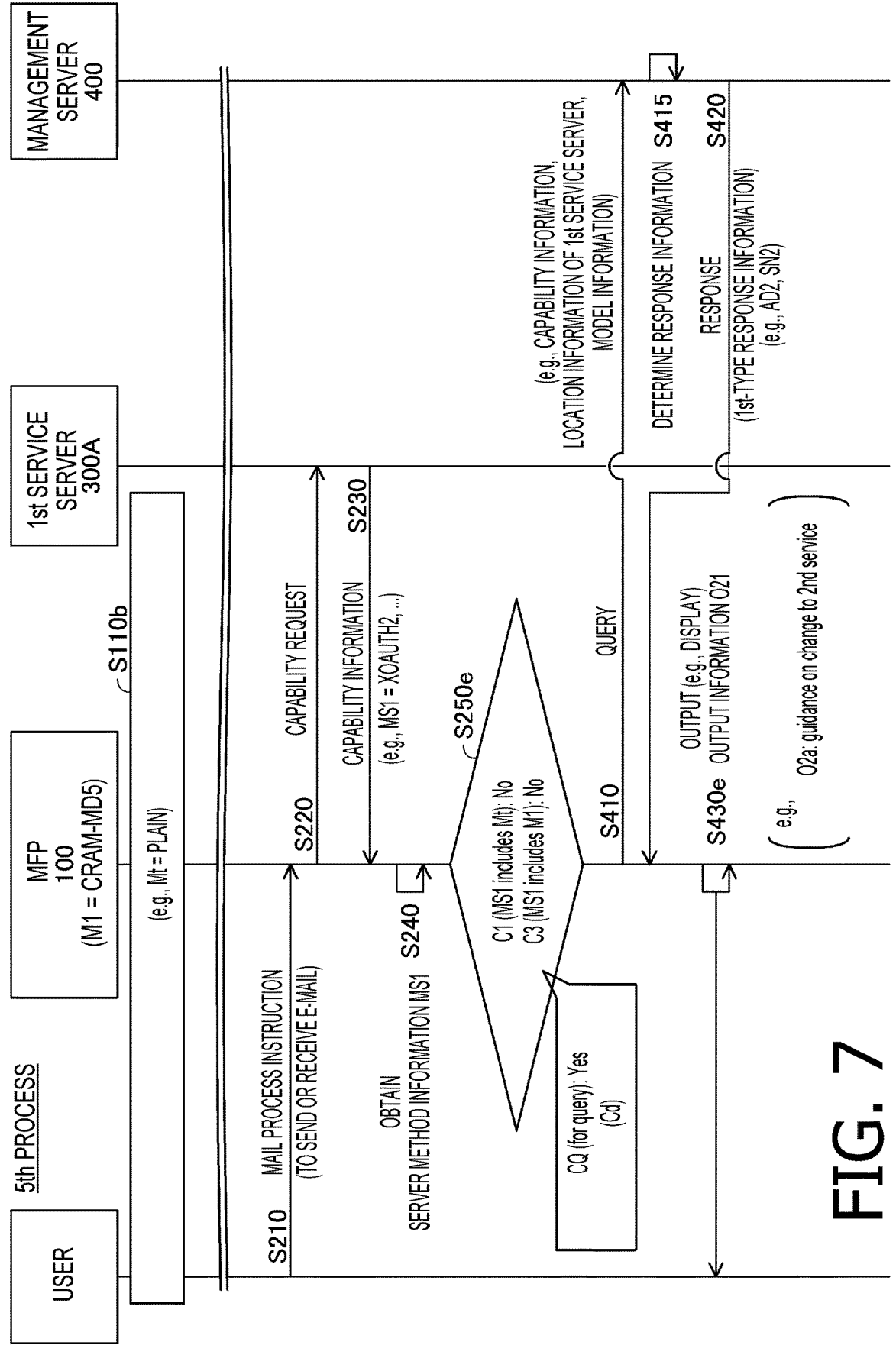
FIG. 7 is a sequence chart showing a procedure of a fifth process that is an example of the communication processing.

FIG. 7 is a sequence chart showing a fifth process, which is an example of the communication processing. The fifth process corresponds to No. 5 to No. 7 in FIG. 3. The conditions (i.e., C1: No, and C3: No) for No. 5 to No. 7 may be satisfied, for instance, when the first server 300A discontinues the support for the configured control method Mt. Here, it is assumed that in the fifth process, the candidate control method M1 set in the MFP 100 is "CRAM-VID5."

In FIG. 7, S110*b* is substantially the same as S110*b* in FIG. 4. Specifically, in S110*b* of FIG. 7, the access settings for "PLAIN" are configured. It is assumed that the first server 300A supports "PLAIN."

In FIG. 7, methods used in S210, S220, S230, and S240 are substantially the same as the methods used in S210, S220, S230, and S240 of FIG. 2, respectively. In the fifth process, it is assumed that the server method information MS1 includes "XOAUTH2" without including any of "PLAIN" and "CRAM-MD5."

In S250*e*, the processor 110 makes a process condition determination. Specifically, in S250*e* of the fifth process, the processor 110 makes a determination of C1: No and C3: No. Namely, the query process condition CQ is satisfied.

When the query process condition CQ is satisfied, in S410, the processor 110 sends a query related to the access control method to be set for the MFP 100 to the management server 400. This query includes data representing a plurality of pieces of information, such as the capability information obtained in S230, location information (e.g., an IP address, and a domain name) that indicates a location of the first server 300A on the network, and model information (in the first illustrative embodiment, a combination of a model name and versions of the firmware FWp and FWd) of the MFP 100.

Figure 8:
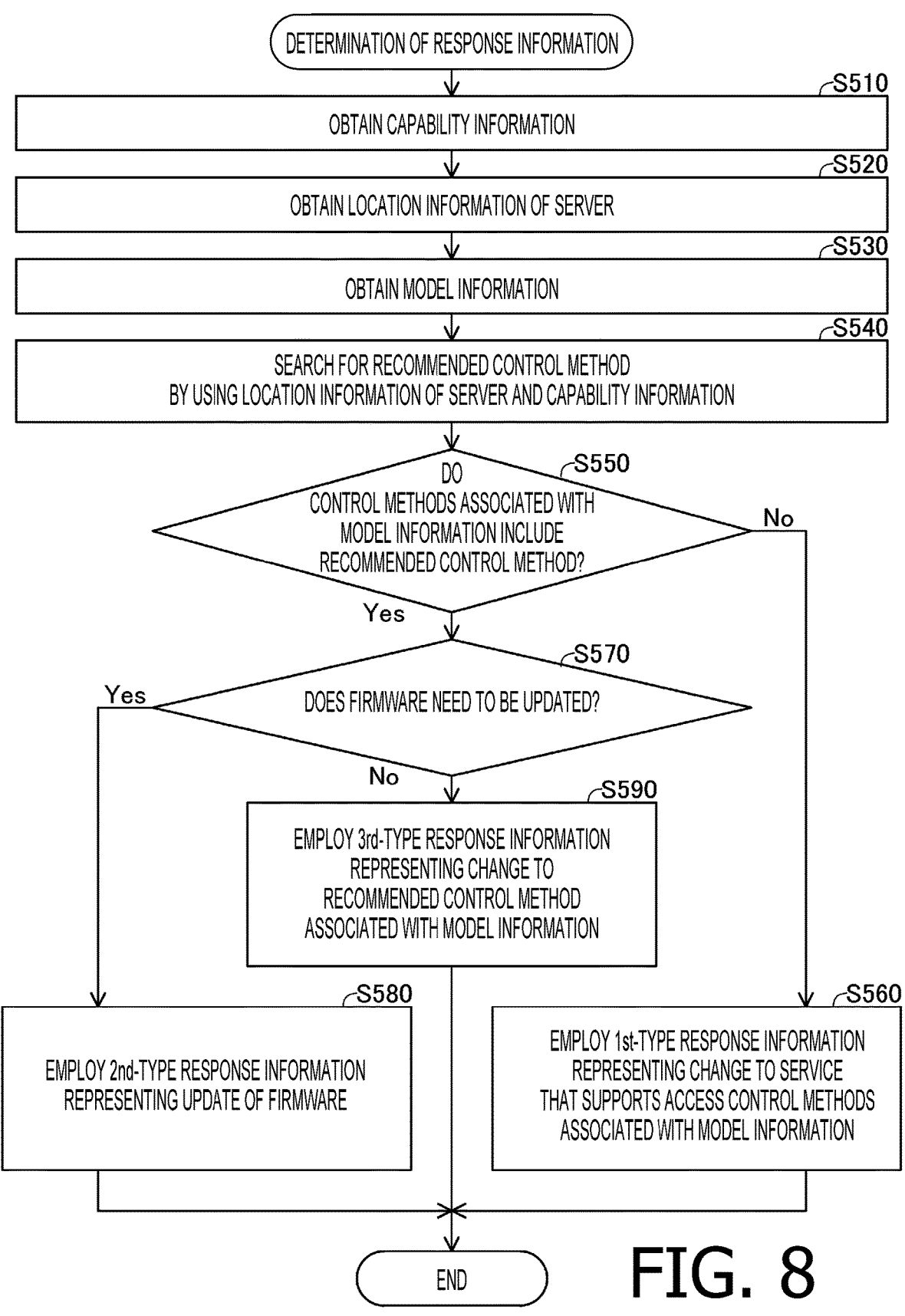
FIG. 8 is a flowchart showing a procedure of a process of determining response information.

In S415, the processor 410 of the management server 400 determines response information in response to the query. FIG. 8 is a flowchart showing an example of a process of determining the response information. In S510, the processor 410 obtains the capability information from the query received from the MFP 100. In S520, the processor 410 obtains the location information of the server from the query. In S530, the processor 410 obtains the model information from the query.

In S540, the processor 410 searches for a recommended control method by using the location information (e.g., a logical address) of the server, the capability information, and the server table D4A (see FIG. 1).

FIG. 9A shows an example of the server table D4A. The server table D4A represents each correspondence relationship among location information AD of a corresponding server, a service name SN, and recommended access control methods MA (hereinafter, which may be referred to as "recommended server methods MA"). Such correspondence relationships in the server table D4A are previously set by an administrator of the management server 400. The administrator collects information of various service servers and registers the collected information in the server table D4A. In each correspondence relationship, access control methods with higher security levels among the access control methods supported by the server are employed as the recommended server methods MA.

In S540 (see FIG. 8), the processor 410 obtains the recommended server methods MA, which are associated with the location information of the server, from the server table D4A. The processor 410 employs, as the recommended control method, an access control method included in both the recommended server methods MA and the server method information MS1 that is included in the capability information. Here, it is assumed that the location information AD of the first server 300A is first location information AD1 and that the location information AD of the second service server 300B (hereinafter, which may be referred to as the "second server 300B") is second location information AD2. A first recommended server method MA1 of the first server 300A is "XOAUTH2." The server method information MS1 (see S230 in FIG. 7) includes "XOAUTH2." Therefore, the processor 410 employs "XOAUTH2" as the recommended control method.

Normally, the recommended server methods MA in the server table D4A are included in the server method information in the capability information. The access control methods supported by each service server may be changed. If this change is not reflected in the server table D4A, an access control method included in the recommended server methods MA may not be included in the server method information. In the first illustrative embodiment, the access control method that is common to the recommended server methods MA and the server method information is employed as the recommended control method. This reduces the possibility that the recommended control method is not supported by the corresponding server.

In S550 (see FIG. 8), the processor 410 determines whether the access control methods associated with the model information include the recommended control method. In this determination, the processor 410 refers to the terminal table D4B. FIG. 9B shows an example of the terminal table D4B. The terminal table D4B represents each correspondence relationship between the model information MI of a corresponding communication device and usable access control methods MB (hereinafter, which may be referred to as "terminal methods MB").

The model information MI represents a model name MD and a firmware version FWv. In the first illustrative embodiment, the firmware version FWv represents a version of the set of the firmware FWp and FWd (see FIG. 1). The terminal methods MB may differ among a plurality of firmware versions FWv for the same model name MD.

Such correspondence relationships in the terminal table D4B are previously set by the administrator of the management server 400. The administrator collects information of various communication devices and registers the collected information in the terminal table D4B.

Here, it is assumed that the model information MI of the MFP 100 includes a first model name MDa. The processor 410 searches for a correspondence relationship including the first model name MDa from the terminal table D4B. Then, first model information MIa1 is assumed to be found. First terminal methods MBa1 associated with the first model information MIa1 include "PLAIN" and "CRAM-MD5" without including the recommended control method (in this case, XOAUTH2). Therefore, in this case, the processor 410 makes a negative determination in S550 (i.e., S550: No).

In response to making the negative determination in S550 (S550: No), the processor 410 employs first-type response information in S560. The first-type response information represents a change to another service that supports the terminal methods MB. In the first illustrative embodiment, the processor 410 refers to the server table D4A (see FIG. 9A) to search for the recommended server methods MA that include an access control method included in the first terminal methods MBa1 of the MFP 100. In the first illustrative embodiment, second recommended server methods MA2 include "CRAM-MD5" included in the first terminal methods MBa1. Accordingly, the processor 410 generates the first-type response information representing a change to the service associated with the second recommended server methods MA2. The first-type response information may include one or both of the second location information AD2 and a second service name SN2 that are associated with the second recommended server methods MA2.

After S560, the processor 410 terminates the process shown in FIG. 8. A case in which the processor 410 makes an affirmative determination in S550 (S550: Yes) will be described later.

After the process shown in FIG. 8, i.e., after S415 in FIG. 7, the processor 410 sends a response to the MFP 100 in S420. In the fifth process, this response includes the first-type response information.

In S430*e*, the processor 110 of the MFP 100 outputs second output information O21 by using the response from the management server 400. The second output information O21 represents response information included in the response. The second output information O21 output in the fifth process includes service change information O2*a*. The service change information O2*a* provides guidance on a change of the service to the second service represented by the second location information AD2 or the second service name SN2 as obtained in S420. The service change information O2*a* may include one or both of the second location information AD2 and the second service name SN2. An output method for outputting the second output information O21 may be the same as the output method in S310*c* (see FIG. 5). The user is allowed to know, from the second output information O21, that a change to the second service is recommended. Accordingly, the user may promptly change the service. This reduces the possibility of communication errors between the MFP 100 and the service server being resolved.

A2-6. Sixth Process

Figure 10:
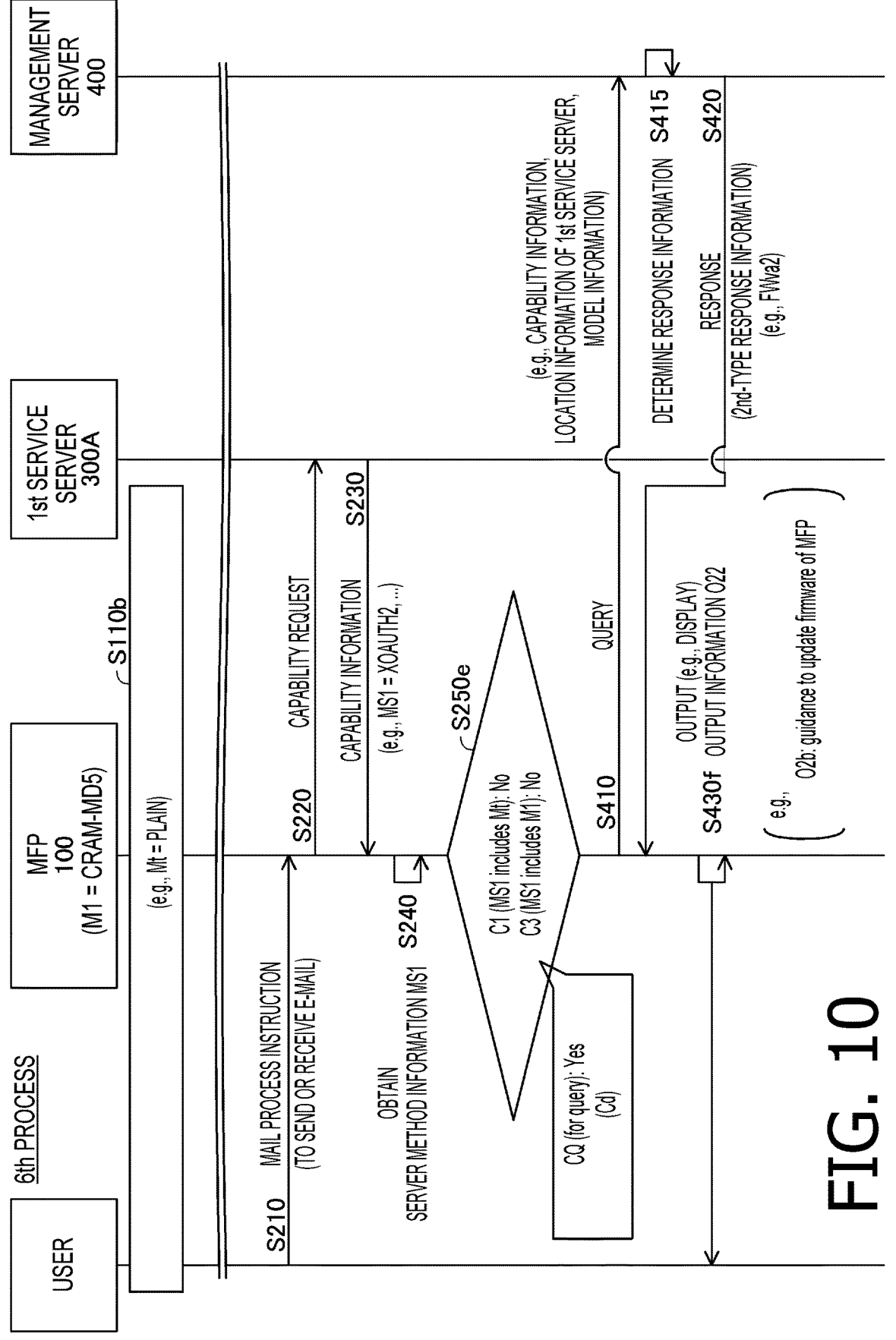
FIG. 10 is a sequence chart showing a procedure of a sixth process that is an example of the communication processing.

FIG. 10 is a sequence chart showing a sixth process, which is an example of the communication processing. The sixth process corresponds to No. 5 to No. 7 in FIG. 3. In substantially the same manner as the fifth process (see FIG. 7), the sixth process is a process in a case where the server method information MS1 includes neither the configured control method Mt nor the candidate control method M1 (i.e., C1: No, and C3: No). Here, it is assumed that by updating the firmware FWp and FWd of the MFP 100, the MFP 100 is enabled to use the one or more access control methods supported by the first server 300A. Here, it is assumed that the candidate control method M1 is "CRAM-MD5."

In FIG. 10, methods used in S110*b*, S210, S220, S230, S240, and S250*e* are substantially the same as the methods used in S110*b*, S210, S220, S230, S240, and S250*e* of FIG. 7, respectively. In the sixth process, it is assumed that the server method information MS1 includes "XOAUTH2" without including any of "PLAIN" and "CRAM-MD5." In S250*e*, the query process condition CQ is satisfied.

In FIG. 10, methods used in S410, S415, and S420 are substantially the same as the methods used in S410, S415, and S420 of FIG. 7, respectively. Here, response information determined in S415 is different from the first-type response information in FIG. 7.

In S415, the processor 410 performs the process shown in FIG. 8. In the sixth process, methods used in S510 to S540 of FIG. 8 are substantially the same as the methods used in S510 to S540 in the fifth process (see FIG. 7), respectively. The processor 410 employs "XOAUTH2" as the recommended control method.

In S550, the processor 410 refers to the terminal table D4B. FIG. 9C shows an example of the terminal table D4B. Unlike the terminal table D4B in FIG. 9B, second model information MIa2 corresponding to the first model name MDa of the MFP 100 is added. Differences between the second model information MIa2 and the first model information MIa1 are that in the second model information MIa2, the firmware version FWv is updated from FWva1 for the first model information MIa1 to FWva2, and "XOAUTH2" is added to the terminal methods MB. In the sixth process, it is assumed that the processor 410 refers to the terminal table D4B shown in FIG. 9C.

The processor 410 searches for correspondence relationships including the first model name MDa from the terminal table D4B. Here, it is assumed that the first model information MIa1 and the second model information MIa2 are found. The processor 410 searches for the recommended control method from terminal methods MB that are associated with the found model information MI (i.e., the first model information MIa1 and the second model information MIa2). The second terminal methods MBa2 associated with the second model information MIa21 include the recommended control method (i.e., XOAUTH2). Therefore, the processor 410 makes the affirmative determination in S550 (S550: Yes).

In response to making the affirmative determination in S550 (S550: Yes), in S570, the processor 410 determines whether the firmware needs to be updated. When the terminal methods MB associated with the model name MD and the firmware version FWv of the MFP 100 do not include the recommended control method, the processor 110 determines that the firmware needs to be updated. Here, it is assumed that the model name MD and the firmware version FWv of the MFP 100 are associated with the first model information MIa1. In this case, since the first terminal methods MBa1 do not include the recommended control method (i.e., XOAUTH2), the processor 410 determines that the firmware needs to be updated (S570: Yes).

In response to making an affirmative determination in S570 (S570: Yes), in S580, the processor 410 employs second-type response information. The second-type response information represents an update of the firmware. The second-type response information may include a new firmware version (in this case, FWva2 in FIG. 9C) in which the recommended control method is usable.

After S580, the processor 410 terminates the process shown in FIG. 8. A case in which the processor 410 makes a negative determination in S570 (S570: No) will be described later.

After the process shown in FIG. 8, i.e., after S415 in FIG. 10, in S420, the processor 410 sends a response to the MFP 100. In the sixth process, this response includes the second-type response information.

In S430f, the processor 110 of the MFP 100 outputs second output information O22 by using the response received from the management server 400. The second output information O22 output in the sixth process includes update information O2b. The update information O2b provides guidance to update the firmware of the MFP 100. The update information O2b may include the new firmware version (in this case, FWva2 in FIG. 9C) that has been obtained in S420. A method for outputting the second output information O22 may be the same as the method used in S310c (see FIG. 5). The user is allowed to know, from the second output information O22, that the firmware is recommended to be updated. Therefore, the user may promptly update the firmware. Thus, it is possible to reduce the possibility of communication errors between the MFP 100 and the service server.

A2-7. Seventh Process

Figure 11:
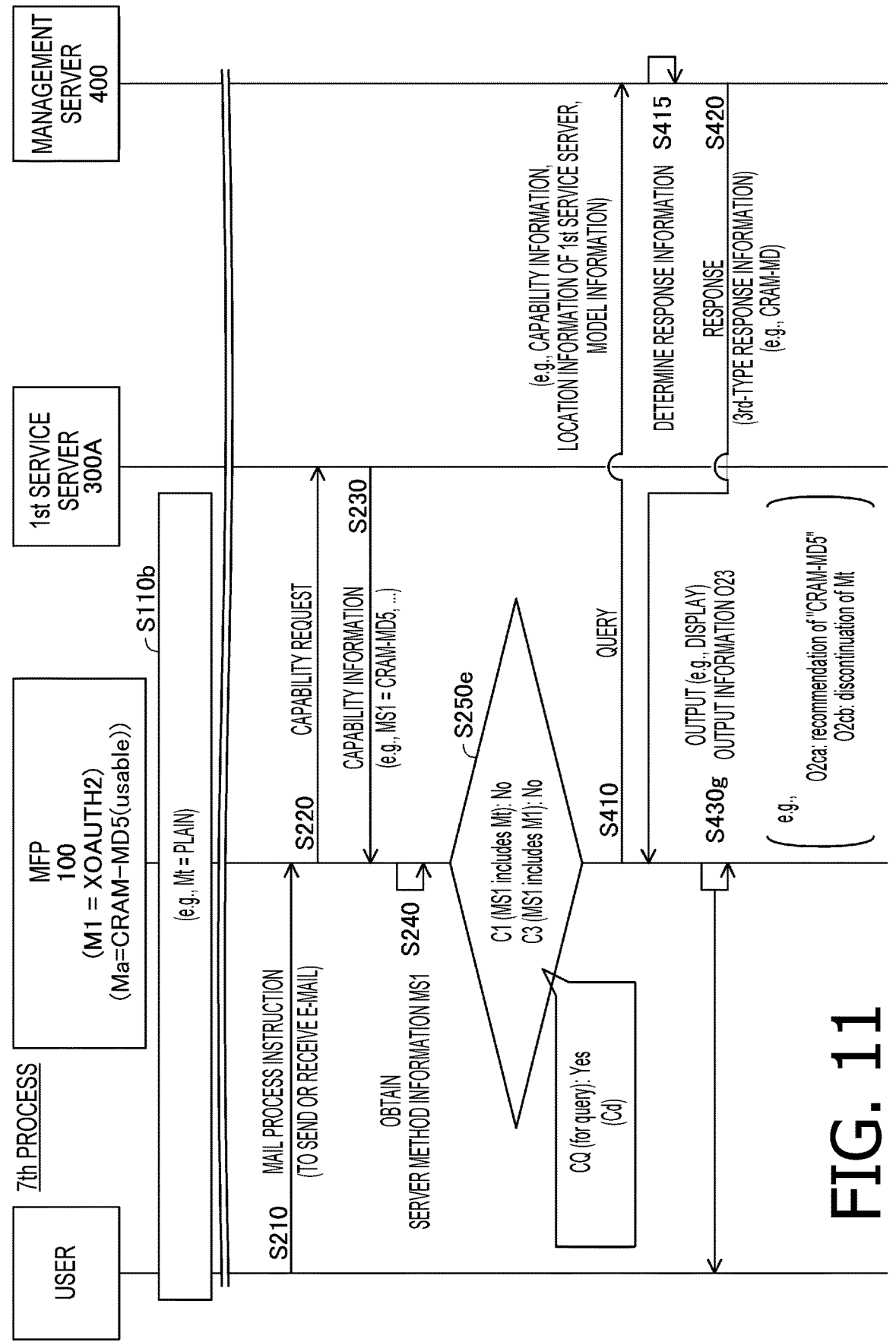
FIG. 11 is a sequence chart showing a procedure of a seventh process that is an example of the communication processing.

FIG. 11 is a sequence chart showing a seventh process, which is an example of the communication processing. The seventh process corresponds to No. 5 to No. 7 in FIG. 3. In substantially the same manner as the sixth process (see FIG. 10), the seventh process is a process in a case where the server method information MS1 includes neither the configured control method Mt nor the candidate control method M1 (i.e., C1: No, and C3: No). Here, it is assumed that the candidate control method M1 is "XOAUTH2." In addition, it is assumed that the MFP 100 may use an access control method (hereinafter referred to as a "first control method Ma") that is different from any of the configured control method Mt and the candidate control method M1. It is assumed that the first control method Ma is "CRAM-MD5."

In FIG. 11, methods used in S110b, S210, S220, S230, S240, and S250e are substantially the same as the methods used in S110b, S210, S220, S230, S240, and S250e of FIG. 10. In the seventh process, it is assumed that the server method information MS1 includes "CRAM-MD5" without including any of "PLAIN" and "XOAUTH2." In S250e, the query process condition CQ is satisfied.

In FIG. 11, methods used in S410, S415, and S420 are substantially the same as the methods used in S410, S415, and S420 of FIG. 10, respectively. Here, the response information determined in S415 is different from the second-type response information in FIG. 10.

In S415, the processor 410 performs the process shown in FIG. 8. In the seventh process, methods used in S510-S550 are substantially the same as the methods used in S510-S550 in the sixth process (see FIG. 10), respectively. It is assumed that the recommended server method MA of the first server 300A indicates "CRAM-MD5," although the server table D4A indicating this assumption is not shown in any drawings. In this case, the processor 410 employs "CRAM-MD5" as the recommended control method. In addition, it is assumed that the terminal methods MB associated with the model information MI of the MFP 100 include the recommended control method (in this case, CRAM-MD5, which is the first control method Ma), although the terminal table D4B indicating this assumption is not shown in any drawings. In this case, the processor 410 makes the affirmative determination in S550 (S550: Yes) and makes the negative determination in S570 (S570: No). Then, the processor 410 proceeds to S590.

In S590, the processor 410 employs third-type response information. The third-type response information represents a change to the recommended control method (in this case, CRAM-MD5, which is the first control method Ma) that is associated with the model information MI. The third-type response information contains information representing the recommended control method.

After S590, the processor 410 terminates the process shown in FIG. 8 (i.e., completes S415 of FIG. 11). In S420, the processor 410 sends the response to the MFP 100. In the seventh process, this response contains the third-type response information.

In S430g, the processor 110 of the MFP 100 outputs second output information O23 by using the response from the management server 400. The second output information O23 output in the seventh process may include at least one of various types of information for prompting the user to change the configured control method Mt to the recommended control method (in this case, the first control method Ma). For instance, the second output information O23 may include recommendation information O2ca representing the recommended control method obtained in S420. The recommendation information O2ca may include a message for recommending the recommended control method. The second output information O23 may include discontinuance information O2cb representing discontinuance of the configured control method Mt. An output method for outputting the second output information O23 may be the same as the output method used in S310c (see FIG. 5). The user is allowed to know, from the second output information O23, that the recommended control method is recommended. Therefore, the user may promptly configure access settings for changing the configured control method Mt to the recommended control method. This reduces the possibility of communication errors between the MFP 100 and the service server.

As described above, in the first illustrative embodiment, the MFP 100 (see FIG. 1) has the second storage area SA2. The second storage area SA2 is configured to store the configured control method Mt and the candidate control method M1. The configured control method Mt indicates an access control method that is currently configured to be used by the MFP 100. The candidate control method M1 indicate candidates for the configured control method Mt. Each of the configured control method Mt and the candidate control method M1 may be an example of method information indicating an access control method usable by the MFP 100. The second storage area SA2 may be an example of a method storage area configured to store the method information.

The processor 110 of the MFP 100 performs the following process. In S220 (see e.g., FIG. 5), the processor 110 sends a request for the server method information MS1 to the first server 300A. The server method information MS1 is information indicating one or more server control methods. The one or more server control methods are the one or more access control methods supported by the first server 300A. In S230 (see e.g., FIG. 5), the processor 110 receives from the first server 300A a response including the server method information MS1. As shown in FIG. 5, when the change process condition CX is satisfied (S250c), in S310c, the processor 110 outputs the first output information O11 for prompting the user to change the configured control method Mt to the candidate control method M1. Likewise, as shown in FIG. 6, when the change process condition CX is satisfied (S250d), in S310d, the processor 110 outputs the first output information O12 for prompting the user to change the configured control method Mt to the candidate control method M1. As shown in No. 3 and No. 4 of FIG. 3, the change process condition CX contains that one or more server control methods indicated by the server method information MS1 include the candidate control method M1 (C3: Yes).

Thus, when the change process condition CX is satisfied, the first output information O11 and O12 for prompting the user to change the configured control method Mt to the candidate control method M1 is output. This reduces the possibility that the MFP 100 uses an access control method (e.g., the configured control method Mt before it is changed to the candidate control method M1) that is not suitable for the first server 300A can be reduced.

In the first illustrative embodiment, as shown in No. 2 of FIG. 3, in a case (hereinafter referred to as a "first case Ca") where the server method information MS1 includes the configured control method Mt and does not include the candidate control method M1, the change process condition CX is not satisfied. As shown in FIG. 4, in S260b to S280b, the processor 110 communicates with the first server 300A. In the first case Ca, the processor 110 communicates with the first server 300A according to the configured control method Mt without outputting the first output information (e.g., the first output information O11, O12). Improper output of the first output information may increase a burden on the user to manage the MFP 100. In the first illustrative embodiment, in the first case Ca, the MFP 100 communicates with the first server 300A without outputting the first output information. This reduces the possibility of increasing the burden on the user to manage the MFP 100.

In the first illustrative embodiment, as shown in No. 4 of FIG. 3, the change process condition CX is satisfied in a case (hereinafter referred to as a "second case Cb") where the server method information MS1 does not include the configured control method Mt, but includes the candidate control method M1. As shown in FIG. 6, in the second case Cb, in S310d, the processor 110 outputs the first output information O12. This reduces the possibility that communication errors between the MFP 100 and the first server 300A are not resolved.

In the first illustrative embodiment, the access control methods that are usable by the MFP 100 include "PLAIN" and other access control method(s) (e.g., "XOAUTH2"). The candidate control method M1 represents a control method having a higher security level than "PLAIN" among the access control methods that are usable by the MFP 100. When the configured control method Mt is "PLAIN," the security level of the candidate control method M1 is higher than the security level of the configured control method Mt. As shown in No. 3 of FIG. 3, when the server method information MS1 includes the configured control method Mt and the candidate control method M1, and the candidate control method M1 is different from the configured control method Mt, and furthermore, the configured control method Mt is "PLAIN," the security level of the candidate control method M1 is higher than the security level of the configured control method Mt. In such a case, the change process condition CX is satisfied. Then, as shown in FIG. 5, in S310c, the processor 110 outputs the first output information O11. Thus, the processor 110 is enabled to prompt the user to change the configured control method Mt to the candidate control method M1 with a higher security level.

In the first illustrative embodiment, as shown in No. 5 to No. 7 of FIG. 3, the change process condition CX is not satisfied in a case (hereinafter referred to as a "fourth case Cd") where the server method information MS1 includes neither the configured control method Mt nor the candidate control method M1. As shown in FIGS. 7, 10, and 11, in the fourth case Cd, in S410, the processor 110 sends a query related to the access control method to be set for the MFP 100 to the management server 400. In S420, the processor 110 receives a response from the management server 400. In S430e, S430f, and S430g, the processor 110 outputs the second output information O21, O22, and O23, respectively, each information of which is different from the first output information O11 and O12 and represents information contained in the response received from the management server 400. Thus, in the fourth case Cd, the processor 110 is enabled to reduce the possibility of communication errors between the MFP 100 and the service server by outputting the second output information O21, O22, and O23, each information of which represents information contained in the response received from the management server 400.

In the first illustrative embodiment, the first storage area SA1 is configured to store the first firmware FWp. The first firmware FWp includes a plurality of processing modules (e.g., processing modules Mc1 and Mc2). One of the plurality of processing modules complies with the configured control method Mt. The processing module complying with the configured control method Mt has a function of making a request for permission of access based on the configured control method Mt (see e.g., S260 in FIG. 2, and S260b in FIG. 4). In the sixth process (see FIG. 10), the response received in S420 from the management server 400 includes information (in this case, the second-type response information) representing an update of the firmware. In this case, in S430f, the processor 110 outputs the second output information O22 that includes the information (in this case, the update information O2b) for prompting the user to update the firmware. Thereby, the user is allowed to promptly know that it is recommended to update the firmware. Then, the user may promptly update the firmware. In addition, this reduces the possibility of communication errors between the MFP 100 and the service server. Instead of the entire program PG1, firmware, which includes a part of the program PG1 that includes a plurality of processing modules (e.g., the processing modules Mc1 and Mc2), may be updated.

In the first illustrative embodiment, in the fifth process shown in FIG. 7, the response received in S420 from the management server 400 includes information (in this case, the first-type response information) that represents the use of the second service provided by the second server 300B different from the first server 300A, instead of the first service provided by the first server 300A. In this case, in S430e, the processor 110 outputs the second output information O21 that includes information (in this case, the service change information O2a) for prompting the user to use the second service instead of the first service. Thus, the user is allowed to know that a change from the first service to the second service is recommended.

In the first illustrative embodiment, in the seventh process shown in FIG. 11, the response received in S420 from the management server 400 includes information (in this case, the third-type response information) that represents a change of the configured control method Mt to the first control method Ma, which is an access control method that is usable by the MFP 100 and is different from the candidate control method M1. In this case, in S430g, the processor 110 outputs the second output information O23 that includes information (in this case, the recommendation information O2ca) for prompting the user to change the configured control method Mt to the first control method Ma. Thus, the user is allowed to promptly know that the first control method Ma is an appropriate access control method.

In the first illustrative embodiment, as shown in FIGS. 2 and 4, the request sent to the first server 300A by the processor 110 in S280 (see FIG. 2) and S280b (see FIG. 4) may be at least one of the mail transmission request that is a request to send an e-mail, or the mail reception request that is a request to receive an e-mail. It is noted that in the present disclosure, "at least one of A or B" may have substantially the same meaning as "at least one of A and/or B." Furthermore, "at least one of A or B" may have substantially the same meaning as "at least one selected from the group consisting of A and B." In S220, the processor 110 sends a request for the server method information MS1 to the first server 300A, in order to send one or both of the mail transmission request and the mail reception request. Thus, the processor 110 is enabled to obtain the server method information MS1 in order to send an e-mail and/or receive an e-mail. It is noted that either the function of sending e-mails or the function of receiving e-mails may be excluded from the available functions of the MFP 100.

In the first illustrative embodiment, as shown in S120 to S130 (see FIG. 2) and S110b (see e.g., FIG. 4), the configured control method Mt is an access control method selected by the user instruction. Moreover, as described above, the candidate control method M1 is an access control method predetermined before shipment of the MFP 100. The processor 110 of the MFP 100 is enabled to perform appropriate communication by using such information Mt and M1.

B. Second Illustrative Embodiment

Figure 12:
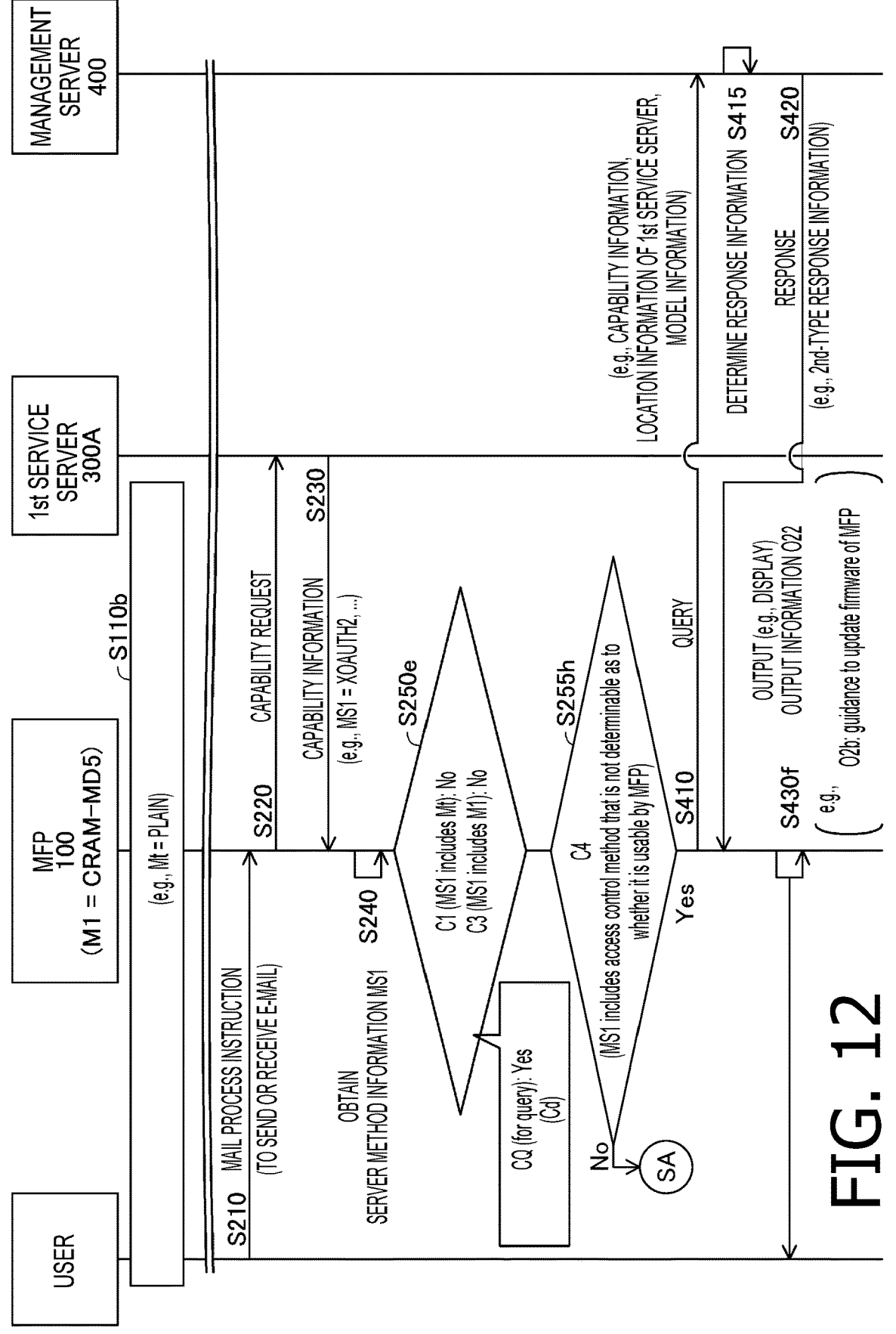
FIGS. 12 and 13 are sequence charts showing a procedure of an example process of the communication processing.
Figure 13:
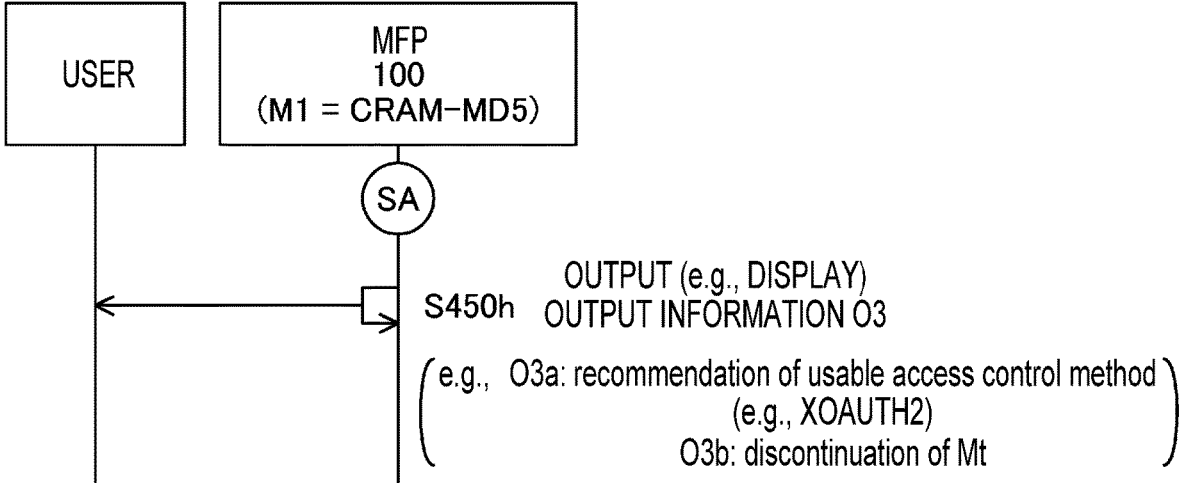

FIGS. 12 and 13 are sequence charts showing an example of the communication processing in a second illustrative embodiment according to aspects of the present disclosure. Unlike the sixth process shown in FIG. 10, S255h is added after S250e. In the process shown in FIGS. 12 and 13, S110b, and S210 to S250e are substantially the same as S110b, and S210 to S250e in FIG. 10, respectively.

In S255h, the processor 110 of the MFP 100 determines whether the server method information MS1 includes an access control method (hereinafter referred to as a "second control method") that is not determinable as to whether it is usable by the MFP 100. In the second illustrative embodiment, the processor 110 treats an access control method that is not included in the access control methods usable by the MFP 100, as the second control method that is not determinable as to whether it is usable by the MFP 100. When the processor 110 is unable to interpret one or more characters string included in the server method information MS1, the processor 110 may determine that the server method information MS1 includes an access control method that is not determinable as to whether it is usable by the MFP 100.

The result of the determination in S255h varies depending on the configurations of the MFP 100 and the first server 300A. Suppose for instance that the access control methods usable by the MFP 100 are "PLAIN" and "CRAM-MD5" and that the server method information MS1 includes "XOAUTH2." In this case, since "XOAUTH2" is the second control method, the result of the determination in S255h is "Yes" (i.e., the processor 110 makes the affirmative determination in S255h).

When the result of the determination in S255h is "Yes" (S255h: Yes), the processor 110 proceeds to S410. After S410, the steps following S410 in one of FIGS. 7, 10, and 11 are executed. FIG. 12 shows a sequence in which the steps in FIG. 10 are executed.

Thus, in the second illustrative embodiment, when the server method information MS1 includes neither the configured control method Mt nor the candidate control method M1 (C1: No, and C3: No in S250e), the processor 110 executes S255h. In S255h, the processor 110 determines whether the server method information MS1 includes the second control method that is not determinable as to whether it is usable by the MFP 100. In a case (hereinafter referred to as a "fifth case") where "C1: No, C3: No, and S255h: Yes," the change process condition CX is not satisfied (in the second illustrative embodiment, the query process condition CQ is satisfied). In the fifth case, S410 and the subsequent steps in one of FIGS. 7, 10, and 11 are executed. In any case, in S410, the processor 110 sends, to the management server 400, a query that includes the capability information including the second control method. Then, in S420, the processor 110 receives, from the management server 400, a response that includes information (in this case, one of the first-type response information, the second-type response information, and the third-type response information) related to the second control method. Thus, the processor 110 is enabled to proceed with appropriate processing for communication with the service server when the server method information MS1 includes the second control method.

Depending on the configurations of the MFP 100 and the first server 300A, the result of the determination in S255h may be "No" (i.e., the processor 110 may make the negative determination in S255h). Suppose for instance that the access control methods usable by the MFP 100 are "PLAIN," "CRAM-MD5," and "XOAUTH2" and that the server method information MS1 includes "XOAUTH2" (where Mt=PLAIN, and M1=CRAM-MD5). In this case, since "XOAUTH2" is an access control method usable by the MFP 100, the result of the determination in S255h is "No." Hereafter, an access control method that is different from any of the configured control method Mt and the candidate control method M1 and is included in the server method information MS1 may be referred to as a "third control method."

When the result of the determination in S255h is "No" (S255h: No), the processor 110 outputs third output information O3 in S450h of FIG. 13. The third output information O3 may include at least one of various types of information for prompting the user to change the configured control method Mt to the third control method. For instance, the third output information O3 may include recommendation information O3a that represents recommendation of the third control method. The third output information O3 may include discontinuation information O3b that represents discontinuation of the configured control method Mt. An output method for outputting the third output information O3 may be substantially the same as the output method used in S310c (see FIG. 5). The user is allowed to know, from the third output information O3, that the third control method is recommended.

C. Third Illustrative Embodiment

Figure 14:
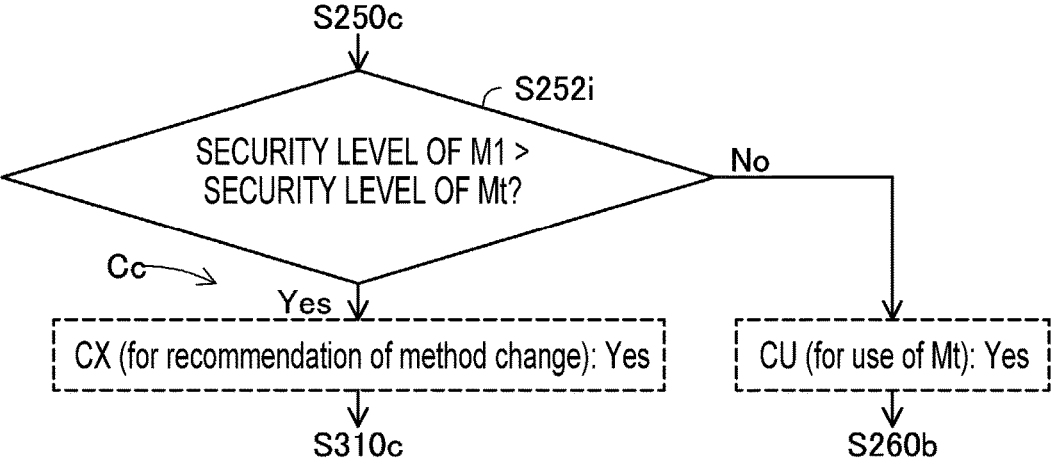
FIG. 14 is a sequence chart showing a partial procedure of an example process of the communication processing.

FIG. 14 is a sequence chart showing an example of the communication processing in a third illustrative embodiment according to aspects of the present disclosure. In the third illustrative embodiment, S252*i* is added after S250*c* in FIG. 5. In S252*i*, the processor 110 determines whether the security level of the candidate control method M1 is higher than the security level of the configured control method Mt. In response to determining in S252*i* that the security level of the candidate control method M1 is higher than the security level of the configured control method Mt (S252*i*: Yes), the processor 110 determines that the change process condition CX is satisfied. Thereafter, the processor 110 proceeds to S310*c* (see FIG. 5). In response to determining in S252*i* that the security level of the candidate control method M1 is not higher than the security level of the configured control method Mt (S252*i*: No), the processor 110 determines that the use process condition CU is satisfied. Thereafter, the processor 110 proceeds to S260*b* (see FIG. 4). Thus, in a case (hereinafter referred to as a "third case Cc") where the server method information MS1 includes the configured control method Mt and the candidate control method M1, and the security level of the candidate control method M1 is higher than the security level of the configured control method Mt, the change process condition CX is satisfied. In the third case Cc, the processor 110 outputs the first output information O11 in S310*c*. Thus, the processor 110 is enabled to prompt the user to change the configured control method Mt to the candidate control method M1 with a higher security level.

While aspects of the present disclosure have been described in conjunction with various example structures outlined above and illustrated in the drawings, various alternatives, modifications, variations, improvements, and/ or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

D. Modifications

Practicable examples of the change condition for outputting the first output information (e.g., the first output information O11, O12 in FIGS. 5 and 6) for prompting the user to change the configured control method Mt to the candidate control method M1 are not limited to the change process condition CX in FIGS. 3 and 14, but may include various conditions including that the server method information MS1 includes the candidate control method M1. For instance, when the server method information MS1 includes the configured control method Mt, the change condition may not be satisfied.

Practicable examples of the process of determining the response information by the management server 400 are not limited to the process shown in FIG. 8 but may include various other processes. For instance, in a case where S570 and S580 are omitted, and "S550: Yes," the processor 410 may proceed to S590. In a case of "S550: No," the processor 410 may employ response information that does not represent other services but represents that the current service is inappropriate. In any case, the processor 110 of the MFP 100 may output the second output information representing the response information from the management server 400.

The management server 400 may be omitted. Practicable examples of the information to be output when the server method information MS1 includes neither the configured control method Mt nor the candidate control method M1 are not limited to the second output information O21, O22 and O23 in FIGS. 7, 10, and 11, but may include various other types of information. For instance, the processor 110 may output warning information representing that the configured control method Mt and the candidate control method M1 are inappropriate.

The configured control method Mt may be predetermined at the time of manufacture (i.e., before shipment) of the MFP 100. The candidate control method M1 may be selected by the user.

Practicable examples of the communication between the MFP 100 and the service server are not limited to the communication for the mail process, but may include communication for various other services. Practicable examples of the request for the server method information MS1 are not limited to the request for the capability information, but may include requests to be made according to various other procedures. For instance, the MFP 100 may make a request for the server method information MS1 using a dedicated protocol for controlling access control methods.

Practicable examples of the configuration of the MFP 100 are not limited to the configuration shown in FIG. 1 but may include various other configurations. For instance, a method storage area (e.g., the second storage area SA2) configured to store the configured control method Mt and the candidate control method M1 and a firmware storage area (e.g., the first storage area SA1) configured to store the firmware for making a request for the access permission based on the configured control method may be formed physically in the same memory or in different memories from each other.

Practicable examples of devices to which aspects of the present disclosure are applicable are not limited to the MFP 100 as described in the above illustrative embodiments and modifications, but may include various communication devices, such as a printer, an image scanner, a sewing machine, a cutting machine, a machine tool, digital a camera, a smart phone, a tablet computer, and a game machine. Practicable examples of the communication between the communication device and the service server are not limited to the communication for the mail process, but may include communication for various services for the communication device. A plurality of devices (e.g., computers) that are communicable with each other via a network may share some (e.g., at least one but not all) of functions for the process of controlling the access control method by the communication device and provide, as a whole, the functions for the process of controlling the access control method. In this case, a system including the plurality of devices may correspond to the communication device.

In each of the above illustrative embodiments and modifications, a part of the configuration realized by the hardware may be replaced with software. Conversely, at least a part of the configuration realized by the software may be replaced with hardware. For instance, the function to determine whether the change process condition CX is satisfied may be realized by a dedicated hardware circuit.

When at least one of the functions according to aspects of the present disclosure is realized by computer programs, the computer programs may be provided in a form stored in a non-transitory computer-readable storage medium. The computer programs may be used in a state stored in a non-transitory computer-readable storage medium that is the same as or different from the non-transitory computer-readable storage medium used when the computer programs were provided. Practicable examples of the "non-transitory computer-readable storage medium" are not limited to portable recording media such as memory cards and CD-ROMs, but may include internal storage devices (e.g., various ROMs) in the computer, and external storage devices (e.g., hard disk drives) connected with the computer.

The following shows examples of associations between elements illustrated in the aforementioned illustrative embodiment(s) and modification(s), and elements claimed according to aspects of the present disclosure. For instance, the MFP 100 may be an example of a "communication device" according to aspects of the present disclosure. The communication I/F 180 may be an example of a "communication interface" according to aspects of the present disclosure. The non-volatile memory 130 may be an example of a "method storage" according to aspects of the present disclosure. The processor 110 may be an example of a "processor" according to aspects of the present disclosure. The non-volatile memory 130 storing the program PG1 may be an example of a "non-transitory computer-readable storage medium storing computer-readable instructions" according to aspects of the present disclosure. The processor 110 may be included in a "controller" according to aspects of the present disclosure. The non-volatile memory 130 storing the program PG1 may be included in the "controller" according to aspects of the present disclosure.

What is claimed is:

1. A communication device comprising:
a communication interface;
a memory configured to store method information indicating access control methods usable by the communication device, the indicated access control methods including a configured control method and a candidate control method having a higher security level than the configured control method, the configured control method being currently set to be used by the communication device, the candidate control method being a candidate for the configured control method; and
a controller configured to:
send a request for server method information indicating one or more server control methods supported by a first server, to the first server via the communication interface;
receive a response including the server method information from the first server via the communication interface;
output first output information to prompt a user to change the configured control method to the candidate control method, in a case where a change condition is satisfied, the change condition including a condition that the one or more server control methods indicated by the received server method information include the candidate control method, wherein the change condition is satisfied in a case where the one or more server control methods do not include the configured control method but include the candidate control method, or where the one or more server control methods include the configured control method and the candidate control method;
cause, without outputting the first output information, the communication interface to communicate with the first server according to the configured control method, when the change condition is not satisfied in a case where the one or more server control methods include the configured control method and do not include the candidate control method; and
in response to input from the user, change the access control method, used by the communication device, to the candidate control method.

2. The communication device according to claim 1, wherein in a case where the one or more server control methods include neither the configured control method nor the candidate control method, the change condition is not satisfied, and the controller is further configured to:
send a query related to an access control method to be set for the communication device to a management server via the communication interface;
receive a response to the query from the management server via the communication interface; and
output second output information that is different from the first output information and is included in the response received from the management server.

3. The communication device according to claim 2, further comprising a firmware storage configured to store firmware to make a request for permission of access based on the configured control method,
wherein the controller is further configured to output the second output information including information to prompt the user to update the firmware, in a case where the response from the management server includes information representing an update of the firmware.

4. The communication device according to claim 2, wherein the controller is further configured to output the second output information including information to prompt the user to use a second service instead of a first service, in a case where the response from the management server includes information representing use of the second service provided by a second server instead of the first service provided by the first server, the second server being different from the first server.

5. The communication device according to claim 2, wherein the controller is further configured to output the second output information including information to prompt the user to change the configured control method to a particular control method, in a case where the response from the management server includes information representing a change of the configured control method to the particular control method that is an access control method usable by the communication device and is different from the candidate control method.

6. The communication device according to claim 1, wherein in a case where the one or more server control methods include neither the configured control method nor the candidate control method, and the one or more server control methods include a specific control method that is not determinable as to whether it is usable by the communication device, the change condition is not satisfied, and the controller is further configured to:
send information indicating the specific control method to a management server via the communication interface; and
receive a response including information related to the specific control method from the management server via the communication interface.

7. The communication device according to claim 1, wherein the controller is further configured to:

send at least one of a mail transmission request to send an e-mail or a mail reception request to receive an e-mail to the first server via the communication interface; and send the request for the server method information to the first server via the communication interface, in order to send at least one of the mail transmission request or the mail reception request.

8. The communication device according to claim 1, wherein the configured control method is an access control method selected by a user instruction, and wherein the candidate control method is an access control method predetermined before shipment of the communication device.

9. A non-transitory computer-readable storage medium storing computer-readable instructions that are executable by a processor of a communication device, the instructions being configured to, when executed by the processor, cause the communication device to:

send a request for server method information indicating one or more server control methods supported by a first server, to the first server via a communication interface of the communication device, wherein the communication device comprises the processor, the communication interface, and a memory configured to store method information indicating access control methods usable by the communication device, the indicated access control methods including a configured control method and a candidate control method having a higher security level than the configured control method, the configured control method being currently set to be used by the communication device, the candidate control method being a candidate for the configured control method;

receive a response including the server method information from the first server via the communication interface;

output first output information to prompt a user to change the configured control method to the candidate control method, in a case where a change condition is satisfied, the change condition including a condition that the one or more server control methods indicated by the received server method information include the candidate control method, wherein the change condition is satisfied in a case where the one or more server control methods do not include the configured control method but include the candidate control method, or where the one or more server control methods include the configured control method and the candidate control method;

cause, without outputting the first output information, the communication interface to communicate with the first server according to the configured control method, when the change condition is not satisfied in a case where the one or more server control methods include the configured control method and do not include the candidate control method; and in response to input from the user, change the access control method, used by the communication device, to the candidate control method.

10. A method implementable on a controller of a communication device, the method comprising:

sending a request for server method information indicating one or more server control methods supported by a first server, to the first server via a communication interface of the communication device, wherein the communication device comprises the controller, the communication interface, and a memory configured to store method information indicating access control methods usable by the communication device, the indicated access control methods including a configured control method and a candidate control method having a higher security level than the configured control method, the configured control method being currently set to be used by the communication device, the candidate control method being a candidate for the configured control method;

receiving a response including the server method information from the first server via the communication interface;

outputting first output information to prompt a user to change the configured control method to the candidate control method, in a case where a change condition is satisfied, the change condition including a condition that the one or more server control methods indicated by the received server method information include the candidate control method, wherein the change condition is satisfied in a case where the one or more server control methods do not include the configured control method but include the candidate control method, or where the one or more server control methods include the configured control method and the candidate control method;

causing, without outputting the first output information, the communication interface to communicate with the first server according to the configured control method, when the change condition is not satisfied in a case where the one or more server control methods include the configured control method and do not include the candidate control method; and in response to input from the user, changing the access control method, used by the communication device, to the candidate control method.

* * * * *